(12) United States Patent
Inkirev

(10) Patent No.: US 12,371,120 B2
(45) Date of Patent: Jul. 29, 2025

(54) VEHICLE WITH A STABILITY SYSTEM THAT COMPENSATES FOR THE CENTRIFUGAL FORCE AND THE TRANSVERSE COMPONENT OF THE INERTIA FORCE WHEN CORNERING

(71) Applicant: Alexey Inkirev, selo Orudyevo (RU)

(72) Inventor: Alexey Inkirev, selo Orudyevo (RU)

( * ) Notice: Subject to any disclaimer, the term of this patent is extended or adjusted under 35 U.S.C. 154(b) by 804 days.

(21) Appl. No.: 17/698,071

(22) Filed: Mar. 18, 2022

(65) Prior Publication Data

US 2022/0355884 A1    Nov. 10, 2022

Related U.S. Application Data

(60) Provisional application No. 63/184,884, filed on May 6, 2021.

(51) Int. Cl.
| | | |
|---|---|---|
| *B62K 5/10* | (2013.01) | |
| *B62K 19/32* | (2006.01) | |
| *B62K 25/28* | (2006.01) | |

(52) U.S. Cl.
CPC .............. *B62K 5/10* (2013.01); *B62K 19/32* (2013.01); *B62K 25/28* (2013.01)

(58) Field of Classification Search
CPC .......... B60G 2200/422; B60G 2200/44; B60G 2204/17; B60Y 2300/045; B60Y 2300/022; B62K 19/32; B60K 7/0007; B60K 2007/0038; B62D 37/04; B62D 53/023; E02F 9/0841; E02F 3/3411; E02F 9/166; B60N 2/14
See application file for complete search history.

(56) References Cited

U.S. PATENT DOCUMENTS

| | | | | |
|---|---|---|---|---|
| 2,883,774 A | * | 4/1959 | Clifford | E02F 3/64 37/417 |
| 3,305,039 A | * | 2/1967 | Molby | E02F 9/0841 180/238 |
| 3,346,975 A | * | 10/1967 | Lajoye | E02F 3/6454 37/415 |

(Continued)

FOREIGN PATENT DOCUMENTS

| | | | | |
|---|---|---|---|---|
| DE | 4219635 A1 | * | 12/1993 | ............. B62D 12/00 |
| FR | 2607092 A1 | * | 5/1988 | |

OTHER PUBLICATIONS

Denscheilmann, DE-4219635-A1, Machine Translation of Specification (Year: 1956).*

(Continued)

*Primary Examiner* — Paul N Dickson
*Assistant Examiner* — Matthew Joseph Ganci
(74) *Attorney, Agent, or Firm* — Nadya Reingand

(57) ABSTRACT

The present invention is a minimum size, maneuverable, comfortable, safe, and inexpensive compact vehicle, having a higher level of cornering/turning stability than the current state of the art. The inventive design may be applied to two-, three-, and four- (or more) wheeled vehicles. The invention may be utilized in the design of the main components of vehicles providing an increased stability during turning, even at high speeds, based on fixed and moveable chassis portions which swing in relation to one another and novel linking mechanisms connected with large and/or wide wheel portions.

21 Claims, 22 Drawing Sheets

(56) References Cited

U.S. PATENT DOCUMENTS

| | | | | |
|---|---|---|---|---|
| 3,568,778 A * | 3/1971 | Swisher, Jr. | ............ | B62D 59/04 |
| | | | | 172/792 |
| 4,053,171 A * | 10/1977 | Hyler | ..................... | B60G 9/027 |
| | | | | 280/124.116 |
| 4,074,768 A * | 2/1978 | Stedman | ................. | E02F 3/765 |
| | | | | 172/742 |
| 4,431,363 A * | 2/1984 | Waite | ....................... | B66C 23/62 |
| | | | | 414/718 |
| 9,783,056 B2 * | 10/2017 | Klein | ..................... | B60K 37/00 |
| 2003/0218374 A1 * | 11/2003 | Kress | ........................ | B60P 1/16 |
| | | | | 298/17 R |

OTHER PUBLICATIONS

Chaneac, FR-2607092-A1, Machine Translation of Specification (Year: 1988).*

* cited by examiner

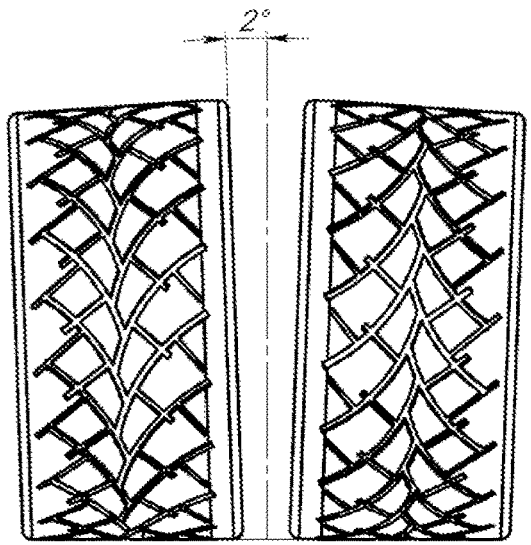 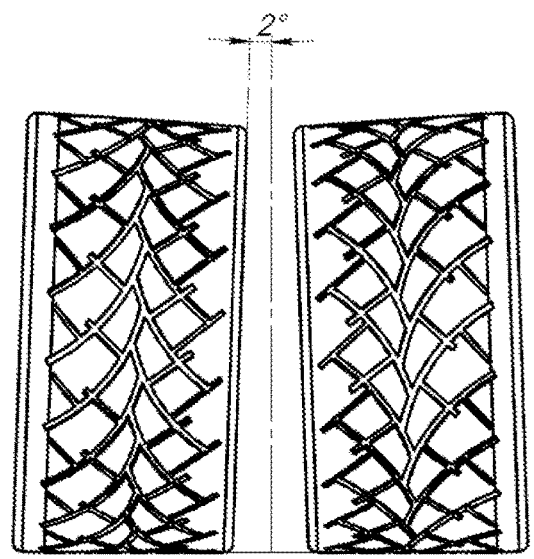
FIG. 11A　　　　　　　　　　　　FIG. 11B
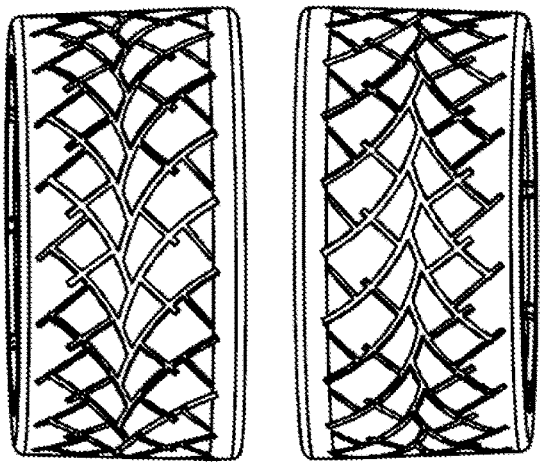 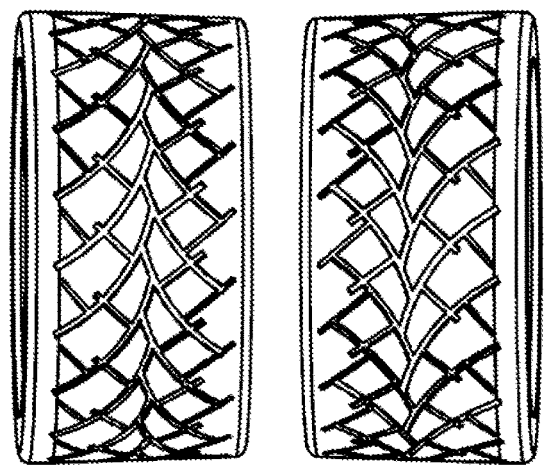
FIG. 11C　　　　　　　　　　　　FIG. 11D

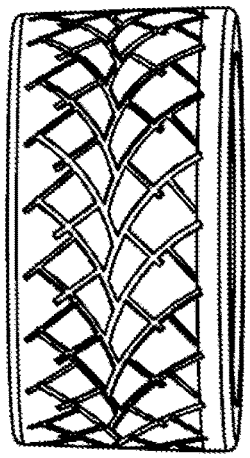
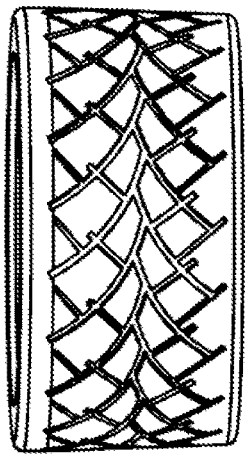
FIG. 11E    FIG. 11F
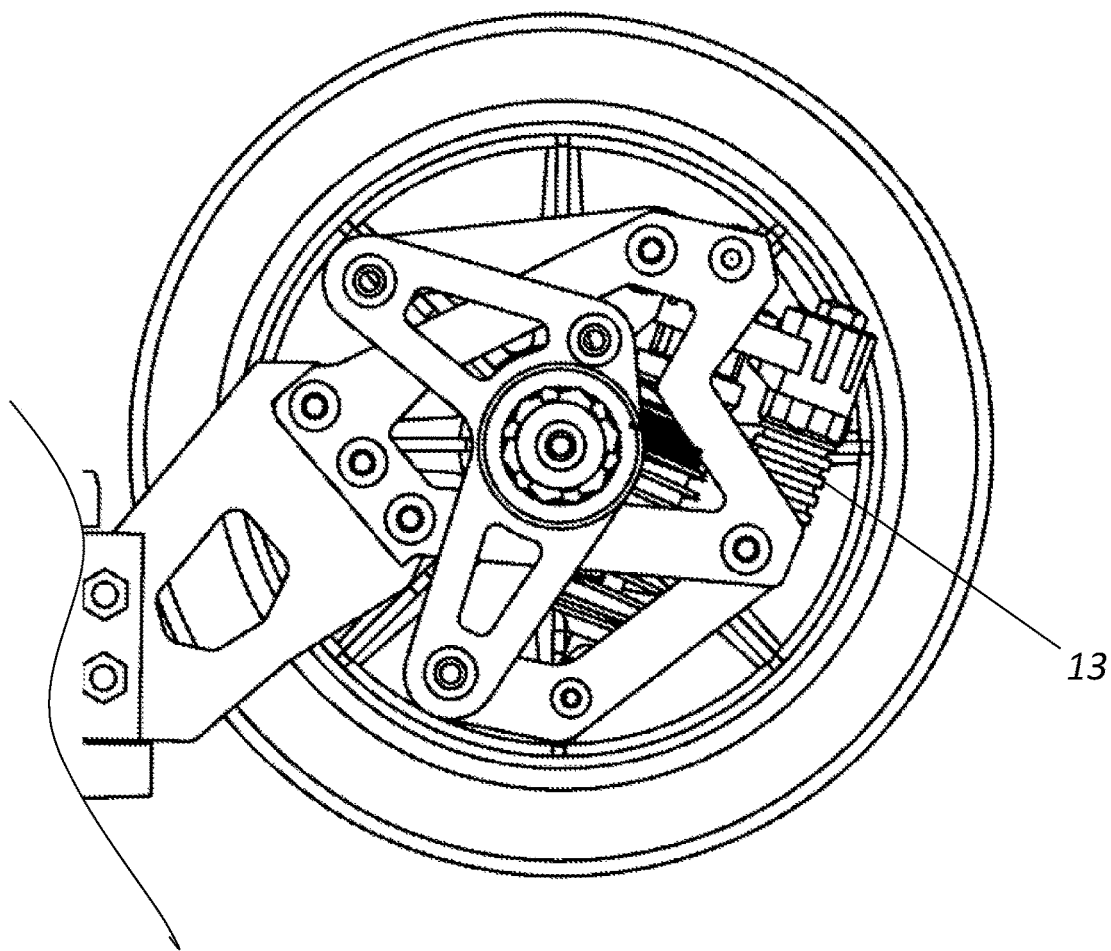
FIG. 12A

VEHICLE WITH A STABILITY SYSTEM THAT COMPENSATES FOR THE CENTRIFUGAL FORCE AND THE TRANSVERSE COMPONENT OF THE INERTIA FORCE WHEN CORNERING

FIELD OF THE INVENTION

This invention relates to the field of narrow and/or compact vehicles, particularly those with high turning stability.

BACKGROUND OF THE INVENTION

In the development process of narrow vehicles (i.e., 750-1000 mm wide), the main problem lies in providing for lateral stability when cornering/turning, and particularly when also driving on a road having a lateral slope. Stability is assessed in terms of critical speeds, rollover, side slip conditions, vehicle inertia, vehicle center of gravity, and centrifugal force.

There are several well-known methods to compensate for these forces. These well-known methods can be divided into several groups as follows.

Geometric methods (i.e., by expanding the wheelbase and/or reducing the height of the vehicle's center of gravity). For example:

Two-track construction with four or more points of support—wheels arranged in two parallel rows. Wider placement of rows results in greater stability. An example is all modern four-wheeled automobiles. There are also three-wheeled vehicles in which stability is achieved by a wide wheelbase. Tricycles (trikes) have only two rear wheels wide apart when the front wheel in the middle is on the third track. Another variant of the three-track design is for reverse trikes, where only the two front wheels are wide apart and the rear wheel in the middle forms the third support. The problems that remain are a resulting wider vehicle, which creates, e.g., congestion and less maneuverability, and a large frontal area which leads to high drag and therefore excessive energy consumption.

Lowering the CG (i.e., center of gravity) has also been suggested to create greater stability during turns. The problem, however, is that the resulting lower center of gravity also reduces ground clearance, thereby limiting the areas accessible to the vehicle.

Force methods (i.e., from the application of compensatory forces to various points of the vehicle during turns). For example:

Stabilization systems currently exist which adjust the stiffness of the suspension by increasing or decreasing the pressure in the air chambers of the air shock absorbers. The problem remaining with such solutions is that a costly system is required for each vehicle manufactured.

The Bose Suspension Stability System is also known, which raises and lowers the wheels to keep the vehicle body level using an electric linear motor in each wheel strut. The problem remaining with this system is that the critical device is both heavy and costly.

Methods of changing the turning radius by controlling all wheels of the vehicle. For example:

An all-wheel steering chassis, wherein the rear wheels turn in the same direction as the front wheels at high speeds, increases the turning radius relative to the instant rotating center (i.e., IRC) and, in turn, reduces the effect of centrifugal force. At low speeds, the rear wheels turn in the opposite direction for better maneuverability, e.g., when parking. The remaining problem is the high complexity of the mechanism required for a two-row arrangement of wheels with a wide base, as well as the high cost of such a system.

Incline methods (i.e., by the simultaneous movement of the center of gravity of the vehicle both vertically and horizontally—in the direction of the turn and lower). For example:

Inclined bicycles, motorcycles, and trikes due to round tires. Remaining problems for two-wheeled vehicles and narrow trikes: a) during steering, when the motorcycle is tilted, its suspension is compressed with an open throttle, as a result of which the tire rotates with a slip, and if the throttle is mistakenly closed, the tire grip is recovered, the suspension expands, creating a large momentum that flips the bike (Highside). b) Tires with a round profile cause a change in the diameter of the wheel at the point of contact with the road, which depends on the angle of inclination at the current moment. Larger angle—a smaller current diameter with the same power at the rear wheel results in increased tire friction and side slip of the motorcycle (Lowside). c) Braking in inclined position leads to both Highside and Lowside, very often due to the instinct of self-preservation. d) The need for early braking before turning or stopping e) Most motorcycles cannot be tilted more than 45 degrees due to design, as foot pegs or mufflers are more likely to be scratched on the asphalt before significant rollover forces are compensated for. f) The need to use a side or center stand in the parking lot and lower your legs when stopping. Remaining trike problems include: they cannot be tilted at a large angle, as their design limits the space for the inner wheel if they have non-steer front wheels, or they are too wide, thereby sharing traffic jams with conventional cars.

Cab tilt of a vehicle with a tilting front wheel when the two rear wheels are not tilting. For example, the Carver One is a three-wheeled enclosed vehicle in which the core technology is Vehicle Dynamic Control (VDC), which allows narrow vehicles to take tight turns while maintaining stability when cornering at higher speeds. Remaining problems include: a) A resulting very heavy vehicle (650 kg)—thus, a lot of energy and enormous power must be used to manage the tipping weight when the cab is upright or tilted more than the current centrifugal force can return to the vertical position or quickly change the side of the tilt; b) a resultingly wide vehicle (1300 mm)—thus, it will also add to traffic jams. A smaller version also exists currently (1000 mm) but has a maximum speed limit of 45 km/h, showing directly that such technology cannot compensate for the significant centrifugal force to provide a sufficient level of stability for a narrow vehicle with a width of motorcycle, even at a 45-degree tilt.

Tilting the cab or the top of the vehicle when the wheels do not tilt. Examples include: a) Pendolino trains use Tiltronix technology and feature hydraulic tilting bogies. The tilting rods installed in the bogies activate the tilting. The body shell sits centered with the use of an active lateral air suspension system. The trains can be used on conventional railroads. The remaining problem is that the angle of inclination is too small—only 8 degrees—so it cannot be used in other industries aside from trains; b) Narrow tilting vehicle with non-tilting wheels and tilt frame with seat or enclosed cab—a narrow track reverse trike that uses automobile type tires with a straight profile rather than curved like motorcycle tires, since the wheels themselves do not tilt in relation to the road. Instead, the entire vehicle cab is housed in a support mechanism that can tilt the cab up to 52 degrees to either side when cornering or on an incline. The tilt here is the movement of some weight around the horizontal longitudinal shaft through the swing arm, the upper end of which is connected to the load (passenger cab), and the lower end is connected to the swing shaft. The trajectory of this movement is a curved arc. The remaining problem is that a lot of energy and tremendous power must be used to control the tipping weight when the cab is upright or tilted more than the current centrifugal force that can return the cab to the upright position or quickly shift it from one side to the other. The cab must thus have a greater height so that more weight can be suspended at a greater distance from the centerline of the vehicle when tilting, and so as not to hit the wide-spaced front wheels. c) A single-track vehicle with constantly vertical steerable wheels with a tire tread width of 400-600 mm and the ability to tilt the frame with the driver or a closed body in the direction of rotation (Patent RU 133498 U1). Here the single wheels of automobile type with a flat profile are applied, at front and rear. Both wheels turn in different directions or only the front one in the direction of turning only simultaneously with the tilt of the frame or body, where the angle of inclination has a rigid dependence on the angle of rotation of the steering wheel or handlebar, similar to how it happens on a skateboard. The remaining problems are: a) the higher the speed, the more the frame or the body with the driver should be tilted, but at the same time the turning radius decreases and the CF increases; b) It is very difficult to make the arrangement of the suspension, steering, and tilt assemblies that work effectively.

Shifting methods (i.e., due to the movement of the center of gravity of the vehicle in the direction of the turn, in the horizontal plane). For example:

A device is known for increasing the stability of movement of freight vehicles (Patent RU 1412157 C). The stability is achieved by moving the body towards the turn in the plane of motion perpendicular to the direction of motion when turning. The system consists of guides attached to the vehicle frame, rollers attached to the bottom of the body that move in guides, speed and steering angle sensors, a hydraulic cylinder with a pump and a control device. When turning, the signals from the sensors are processed by the control device (the polarity corresponds to the side of the turn), which issues a command to the pump. The pump forces the working fluid into the hydraulic cylinder in an amount proportional to the centrifugal force calculated by the control device according to a formula. A hydraulic cylinder connected to the body moves the body in the direction of the turn to compensate for the centrifugal force. The remaining problem is that the rails of the guides must be longer than the width of the body by the amount of displacement in each direction, thereby making the vehicle too wide.

SUMMARY OF THE INVENTION

The present invention is a minimum size (no more than 1 meter wide and 2.5 meters long), maneuverable, comfortable, safe, and inexpensive compact vehicle, having a higher level of cornering/turning stability than a modern passenger car or its equivalents.

The invention comprises improvements to known designs for two-, three-, and four- (or more) wheeled vehicles. In particular, the invention may be utilized in the design of the main components of vehicles providing an increased stability during turning, even at high speeds. The inventive vehicles may have the dimensions of conventional cars or preferably is compact and narrow, like a motorcycle.

BRIEF DESCRIPTION OF THE DRAWINGS

The invention is illustrated by the following diagrams.

FIGS. 1A-1C show a lateral shift performed along an arc having a constant radius since the distances between upper pivots and lower pivots are equal. FIGS. 2A-3C show lateral shifts performed along an arc having a changing radius since the distances between upper pivots and lower pivots are unequal.

FIG. 5A shows the axles of the pivot arms to be fixed such that the chassis is inclined forward (1-5 degrees) relative to the vertical axis, wherein the pivot arms' points of connection to the fixed part of the chassis are placed closer to the rear wheel than the front wheel. FIG. 5B shows the axles of the pivot arms to be fixed such that the chassis is inclined backward (1-5 degrees) relative to the vertical axis, wherein the pivot arms' points of connection to the fixed part of the chassis are placed closer to the front wheel than the rear wheel. FIG. 5C shows the axles of the pivot arms to be fixed at 90 degrees relative to the ground surface, wherein the pivot arms' points of connection to the fixed part of the chassis may be placed either closer to the front wheel or closer to the rear wheel.

FIG. 6A shows the movable part of the chassis comprising two movable elements that move varying distances away from the fixed part of the chassis, thereby forming a step-like structure above the fixed part of the chassis. FIG. 6B shows the step-like structure positioned below the fixed part of the chassis. FIG. 6C shows a third embodiment wherein the step-like structure is expanded in a manner which is non-parallel to the fixed part of the chassis to resemble a spiral step-like structure.

FIG. 7A shows the swing arm of the front wheel positioned behind the front wheel and having a negative castor. The steering tube is also fixed to be inclined forward (1-5 degrees) relative to the vertical axis. FIG. 7B shows the swing arm of the front wheel positioned behind the front wheel and having a zero degree castor. Thus, the steering tube is fixed perpendicular to the ground.

FIG. 8A shows an embodiment where front and rear wheels are steered in different directions. FIG. 8B shows an embodiment where both front and rear wheels are steered in the same direction. FIG. 8C shows an embodiment where one wheel/set of wheels is locked in a straight position while the other wheel/set of wheels is steered in a particular direction.

FIG. 9 shows an example where a vehicle having a total width of 750 mm when positioned in a straight line, has a turning corridor no greater than 1500 mm in width during high speed turning.

FIG. 10A shows 3 equally sized narrow wheels which are positioned along a single axle, said single axle also being attached to a swing arm, wherein each extension of the swing arm is positioned in between 2 of the 3 wheels. FIG. 10B shows 2 equally sized narrow wheels positioned along separate semi-axles at a distance from one another, wherein the extensions of the swing arm are attached to each semi-axle and located between the 2 wheels. FIG. 10C shows an embodiment comprising a set of 3 narrow wheels as shown in FIG. 5A, paired with a set of wide rear wheels. FIG. 10D shows an embodiment comprising a set of 2 narrow wheels as shown in FIG. 5B, paired with a set of wide rear wheels.

FIGS. 11A-11F. Varying embodiments for tire profiles are shown here, thereby adjusting the camber and/or toe of the wheels of the vehicle. FIG. 11A shows a tire profile resulting in a positive camber. FIG. 11B shows a tire profile resulting in a negative camber. FIG. 11C shows a tire profile resulting in a positive camber and a positive toe. FIG. 11D shows a tire profile resulting in a negative camber and a positive toe. FIG. 11E shows a tire profile resulting in a positive camber and a negative toe. FIG. 11F shows a tire profile resulting in a negative camber and a negative toe.

FIGS. 12A-12B. The inner space of the wheels of the vehicle is shown here. The large diameter and width of the wheels allows for the placement of nearly all the elements of the suspension and the electric motor within the inner space. This inner space, in turn, protects such elements from flying stones, dust, water, etc. FIG. 12A shows an exemplary front wheel suspension located in the inner space. FIG. 12B shows an exemplary rear wheel suspension and motor with the second wheel of the rear wheel pair detached.

FIG. 13A shows the positions of the mechanism's elements in a straight line motion, wherein the fulcrum of the front wheels and the vehicle's center of gravity are in line. FIG. 13B shows the vehicle making a right turn, wherein the swing arm moves to the left in order to shift the vehicle's center of gravity to the right relative to the fulcrum of the front wheels as the vehicle turns to the right.

DETAILED DESCRIPTION OF THE PREFERRED EMBODIMENT

Figure 1A:
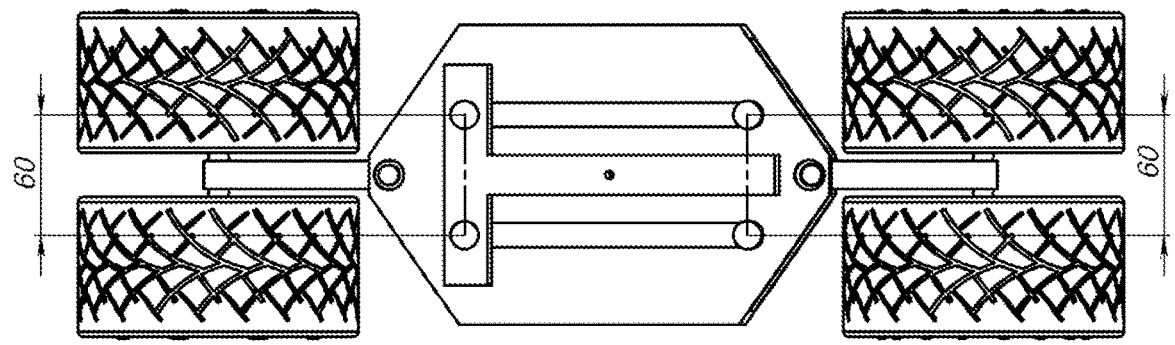
FIGS. 1A-1C, 2A-2C, 3A-3C. These figures illustrate the lateral shift of a movable part of the chassis, having meaningful mass, in the horizontal plane relative to the fixed midsection of chassis by the pivot arms.

The present invention provides the vehicle with a high level of cornering stability, even given its narrow width, due to the implementation of either all four components of the inventive system, each component separately, or any combination of said 4 components. The four components are described herein below.

The first component is an improvement of the principle regarding the use of a lateral displacement (i.e., a lateral/horizontal shift) of the vehicle's center of gravity in the direction of the turn via a shifting of the movable part of the chassis. The lateral shift is performed relative to the vehicle's direction of travel, and relative to the connection between wheels, to prevent roll. Roll may be due to the action of centrifugal forces on the vehicle during a turn. Roll may also be due to the lateral slope of the road, loss of tire grip, or an excessive turning of the vehicle around a corner, and resulting in possible overturning (i.e., flipping) of the vehicle. During rectilinear motion, e.g., when roll compensation is not required, the movable part can remain inside the dimensions of the fixed part. When shifting laterally is beneficial, however, the movable part of the chassis also has the capability to move beyond the dimensions of the fixed part of the chassis. Such a lateral shift can comprise the displacement of the entire main body of the vehicle, including the cab with the driver, relative to the fixed part of the chassis and relative to the wheels.

According to Patent RU1412157C, devices for increasing the stability of the movement of freight vehicles can be implemented in several ways. This can be a carriage on guide tubes or rails, or a slider in guide slots or a roller carriage, a cam mechanism, or another known method for linear movement. In the present invention, however, the vehicle is narrower, e.g., a passenger car, an ATV, a trike, a motorcycle, etc., which present additional problems due to a lighter total weight of the vehicle. The greater the mass of the moving part, the less lateral movement is required to compensate for the same amount of centrifugal force. With lighter weight and narrower vehicles, additional solutions are required.

In the present invention, the lateral shift is performed using a swing-link mechanism, comprising one or more rotatable swing arms (i.e., pivoting arms). Each of the horizontal swing arms comprise either one section, e.g., a solid arm, or several sections, e.g., a robotic arm or telescopic pipes. Due to the rotatable connectivity of the swing arms, the lateral shift occurs in the horizontal plane along an arc, said arc having either a constant radius or a changing radius, depending on the locations of the connections between swing arms and the chassis, particularly the horizontal distances between such connections (see FIGS. 1A-3C). The same result may also be realized with structures comprising various combinations of levers, which are calculated in length to have intersections (i.e., points of articulation) and attachment points to the chassis to allow for a similar sliding movement of the movable part of the chassis in a horizontal direction relative to the fixed part of the chassis (see FIGS. 4A-4B).

Some embodiments of the present invention comprise a four-link pivoting arm design that moves the movable part of the chassis a significant distance horizontally (e.g., equal to the vehicle's width, the width being about 750-1,000 mm), and at the same time, slightly forward or backward, depending on the design and based on the arc of movement. It might also be preferred that the axles of the pivot arms are fixed having a slight incline forward or backward, relative to the vertical axis (see FIGS. 5A-5C). From such a slight incline of the axles of the pivot arm, the movable part of the chassis, when it is turned, is displaced to the side while simultaneously remaining slightly upward, allowing for a return of the chassis under the influence of gravity to its central position without the need to apply additional power or force from, e.g., a servo motor.

The axles of the pivot arms can be fixed slightly inclined backward when the pivot arms' points of connection to the fixed part of the chassis are placed closer to a front wheel. Alternatively, the axles of the pivot arms can be fixed slightly inclined forward when the same points of connection are placed closer to the rear wheel. See, e.g., FIGS. 5A-5B. A servo motor or simply the power of the vehicle driver is sufficient to handle the shift mechanism. It works in the same way as a heavy hinged door that is easy to open. I.e., when the door frame is installed in an inclined position relative to the vertical axis, the door closes under its own weight. Obviously, shearing is less energy intensive compared to the tilted structures described in the prior art, where the cabin has a hinge on the horizontal axis and should be lowered to a certain height, held for a while, raised back to the center, and quickly shifted to the opposite side.

The movable part of the chassis may comprise one or two or more movable elements that move at different distances, thus forming a step-like structure, e.g., if they are located one above the other (FIGS. 6A-6B), or to look like steps of a spiral staircase (FIG. 6C), or like telescopic pull-out elements that pull out one after the other. The movable part of the chassis can be located above or below the stationary part, or between elements of the stationary part.

In the case of using a servo motor to perform a shift, an electromagnetic brake can be used, which, in the absence of a signal from the control unit processing data from the steering angle, roll and speed sensors, is in a clamped state and prevents spontaneous shift. When a signal appears with a command to turn the levers, the brake is automatically released. The applied shift of a part of the chassis also solves the problem present in tilted designs, namely the problem of intersecting the turned wheels with the tilted cab, thereby providing more design freedom.

Also, it is noted that when colliding with obstacles, the impact usually falls on the lower part of the chassis, and the upper moving part with the driver tends to move by inertia. To absorb this inertial force, shock absorbers can be built into the pivot arm design to soften the forward or sideways pull. The driver's and passenger's seats can also be equipped with seat belts and airbags.

The second component is the chassis design. It has three interlinked elements and has a mechanism for turning both wheels, i.e., front and rear, which significantly narrows the turning corridor. The wheels are connected to the central part (i.e., chassis) of the vehicle by means of linking mechanisms, each linking mechanism comprising a steering head (i.e., a columnar opening in the chassis), a swing arm, the swing arm comprising a steering tube (i.e., a steerer) which is inserted into the steering head, and one or more axles which connect the swing arm to the wheels. Three interlinked portions are thus formed, comprising the front wheel(s), the chassis, and the rear wheel(s). This design is similar to the design of cars of a train, but the central portion comprises no wheels, while the front and rear portions each comprise a set of wheels.

The steering heads for each swing arm are positioned far enough from the wheel axle so that the steering head axis does not cross the outer circumference of the tire. Additionally, the steering heads are positioned entirely behind the front wheel(s) and entirely in front of the rear wheel(s). This arrangement allows the linking mechanisms connecting both sets of wheels to be placed in the lowest possible position, resulting in a lower center of gravity as compared to the prior art (e.g., telescopic fork or the lever fork and their steering heads and frame parts). Such a design further does not require any space for suspension above the wheels.

At the rear wheel, the steering head is located in front of the wheel, tending towards alignment and rectilinear movement upon completion of steering in a known manner, similar to the wheels of an office chair or supermarket trolley.

Figure 7A:
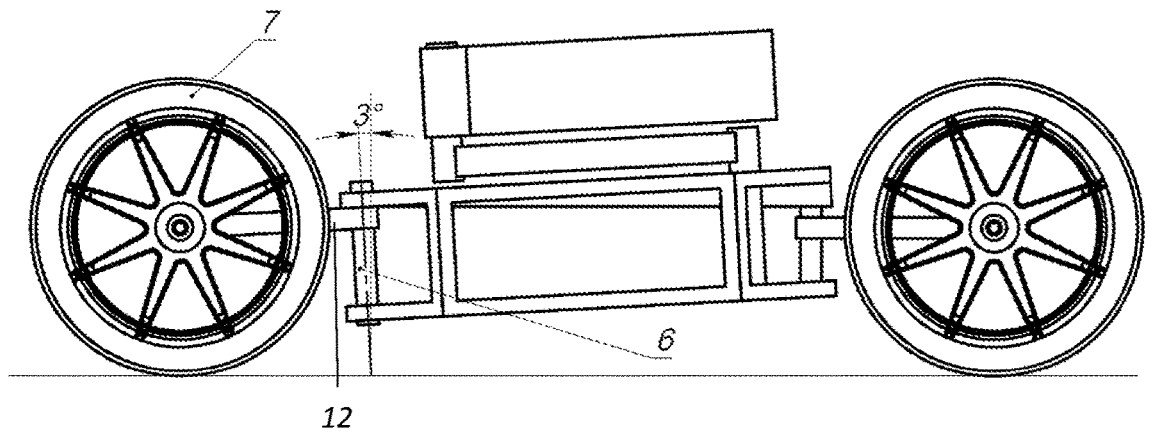
FIGS. 7A-7B. Embodiments where the swing arm of the front wheel is positioned behind the front wheel are shown here.

The steering head of the front wheel swing arm is positioned behind the front wheel and may have a negative castor (see FIG. 7A). Therefore, when turning the front wheel, the central part of the chassis is slightly inclined laterally in the direction of the turn, thus setting the initial impulse for shifting the movable part of the chassis also in the direction of the turn. When the movable part of the chassis returns to the center position, the vehicle's center of gravity also returns to its original position, which in turn naturally (i.e., automatically) returns the front wheel to a straight position.

The wheels may turn simultaneously in different directions or in the same direction. Alternatively, one wheel can be locked in a straight position while the other wheel can act as the wheel steer.

Turning in one direction or another or locking in the central position of the rear (or front) wheel can be carried out according to pre-programmed, mechanically or electronically, combinations of the ratios of the steering angles of the wheels themselves and the angle of rotation of the pivot arms of the side shift mechanism or the shift angle of the movable part of the side shift device as described above regarding the first component, depending on a current speed and turning radius. The algorithm may contain a delay in the return of the moving part to the central position in the phase of exiting the turn or changing the turning radius, and its duration can be determined automatically by the control unit, depending on the value of the centrifugal force.

At low speeds, for example, when parking, the front and rear wheels may be turned in opposite directions, such that the proposed solution of the three-link chassis allows more accurate cornering, reducing the cornering corridor.

At high speeds, and when the wheels are turned in the same direction, the turning corridor instead increases. At the same time, the rear pair of wheels occupies the extreme inner position in the cornering corridor, the front pair occupies the outermost position, and the fixed part of the chassis is located diagonally relative to the direction of travel, providing greater stability, and preventing overturning due to the action of centrifugal force.

The high-speed cornering corridor of a vehicle with a fully activated shift mechanism is approximately 2 times wider than the width of the vehicle (perhaps less but never more). For example, a vehicle with a width of 750 millimeters reaches a maximum width of only 1500 mm, comparable to the width of a motorcycle tilted in a corner, taking into account the dimensions of the pilot.

The third component comprises the use of both front and rear wide split wheels with flat or tapered tires and having a sufficiently large diameter (i.e., rim diameter of 18-22 inches and a total outer diameter of 650-800 mm). Both the front wheel and the rear wheel may alternatively comprise two or more separate, relatively narrow wheels, located on the same axle close to each other or at a small distance from each other, in order to obtain a small gap in the middle for attaching the swing arm. For example, one wheel can comprise four wheels with different diameters, widths, profile heights and be operated with different pressures.

The width of the assembled wheels must ensure a stable position of the vehicle at rest. In the present invention, the width of the wheels reaches a value equal to the width of the vehicle itself In a full-size version, the width of the vehicle can be about 1000 mm (for example, 425 mm width of each tire and 150 mm distance between them), although 750 mm may be sufficient for the same stability.

The wide rear wheel with a flat tire, one-piece or two-wheel, is commonly used in many types of vehicles. However, the use of a front wheel comprising two (or more) relatively narrow wheels with wide flat tires is a novel solution for narrow vehicles such as in the present invention. The preference for a wheel comprising two narrower wheels instead of one wide wheel is due to several reasons: a) It is easier to make tires with a more precise geometry for a smaller width; b) Four vertical walls of a lower and more rigid profile cope better with lateral deviation in a turn than two walls; c) It provides further capability to adjust the camber and toe. In addition to flat profile tires, cone profile tires can be used to adjust the vehicle's camber and toe.

The use of wide tires allows one to obtain reliable grip and reduce side skids to a minimum. In addition, this design allows one to roll smoothly over pits or uneven roads with greater comfort and prevents frontal airflow under the bottom, eliminating the lifting effect to keep the wheels pressed to the road. Also, wide wheels are ideal bumpers that protect the vehicle from damage in case of minor impacts. In serious collisions, by first transferring the impact energy to the lower chassis, this design better protects the passenger in the upper part.

The inner space of the wheels having a large diameter and width further allows to place within the inner space almost all the elements of the suspension and the electric motor with a direct drive, or with some gear, the inner space further acting as protection from moving objects, dust, water, etc. The suspension of the twin wheels is dependent to reduce the roll in the corner. The drive can be for one front or one rear split wheel, or for both wheels at the same time, or the drive for the second wheel can be connected as required.

The fourth component comprises a secondary method of horizontal displacement of the center of gravity, when the displacement of the body during the turn occurs due to the turning of the wheels, where the steering heads for each swing arm are located far enough from the wheel axle in such a way that the axis of the steering heads does not cross the outer circumference of the tire. When the steering wheel (or handlebar) is turned, the front wheel turns simultaneously and the T-shaped swing arm (and thus the T-shaped swing arm steering heads 18) of only the front wheel moves relative to the chassis in the direction opposite to the turn. Thus, the center of gravity of the vehicle is automatically shifted in the direction of the turn. This method can be implemented using a lever or lever-roller, or a rack and pinion mechanism (or a combination thereof), the kinematics of which sets the trajectories that determine the mutual movement of the wheel and the rest of the vehicle (i.e., the chassis).

All the above solutions are suitable not only for a full-size vehicle, but also for radio-controlled models and toys of any size. To confirm the operability of all the above solutions, a radio-controlled model was created in a scale of 1:5, or rather, 150 mm wide, 530 mm long, 300 mm high and having a wheelbase of 390 mm and a total weight of 5 kg. Through repeated experiments using this model, it was possible to determine acceptable stability when the mass ratio of the moving part to the stationary part was about 2 to 3. In particular, the mass of the lower stationary part was 3200 grams when the upper moving part was 1800 grams. The model demonstrates stable passage in a circle with a length of 9.42 m with a radius of 1.5 m in a time of 3.15 seconds when the longitudinal center of the moving part is shifted from the longitudinal centerline of the fixed part of the chassis by 70 mm, when the CG of the stationary part is below the level of the axles of wheels with a diameter of 140 mm, and when the CG of the upper part is at a height of 140 mm.

All wheeled vehicles in a turn are affected by the centrifugal force and the transverse component of the inertia force, striving to send it into a skid or causing it to overturn. The wider the vehicle's wheelbase and the lower its center of gravity, the more stable it is in cornering. The proposed vehicle can significantly reduce the required width/turning corridor of the vehicle while also increasing its stability and maneuverability during turns.

Side shift of the movable part of the chassis. Whether to use the side shift (or not to use it) depends on the height of the vehicle's center of gravity and at what speeds it will be used. In any case, side shift is a great solution to compensate for centrifugal force and transverse inertia when turning, providing a feeling of nearly normal vehicle behavior as opposed to an intimidating cab tilt or a complete vehicle tilt (e.g., like that of motorcycles).

In a two-tier chassis, the driver's cabin can be designed as a comfortable seat with windscreen and head protection for those who enjoy the freedom of a motorcycle with all-around visibility. Alternatively, the design could be a closed capsule with doors similar to a conventional car, or an aerodynamic high-strength cell with a near-supine position for the driver, among other designs.

The driver can operate with his hands by pushing and pulling on the control levers, or by turning the motorcycle-style handlebar or the automobile-type steering wheel. Any of the steering options is connected to the steering head by a linkage system, directly, without any electric or hydraulic assistant, or with them, or by using a joystick (i.e., electronic control panel) for one or both hands to control the servos by wire or radio. The gyro sensor, together with the accelerometer, can detect dangerous acceleration or roll and automatically adjust the turning radius and speed.

The invention proposes to use the horizontal shift of the vehicle's center of gravity towards the turn to combat the centrifugal force and the lateral component of the inertial force.

The invention can also be used to compensate for tipping forces when the road is laterally inclined. The shift can be both one-way and multi-stage, can be used to partially improve the stability of the vehicle, and can fully ensure the stability of the vehicle. The use of the horizontal shift of the center of gravity can significantly reduce the width of the vehicle without loss of comfort, stability, or controllability.

To reduce the cornering corridor, the invention proposes a narrow interlinked chassis with all-wheel steering. For better traction, comfort, and safety, it is preferred to use paired wide wheels with flat tires.

Finally, by combining all (or at least two of) the components, a working model of a new compact vehicle may be implemented, resembling a very narrow ATV, but performing faster, and being more maneuverable and more stable than the current state of the art. All components can be applied either individually or together. In the latter case, a vehicle is obtained that is comparable to the width of an average motorcycle (approximately 750-1,000 mm). At the same time, when compared with motorcycles, it is more stable both in statics and in dynamics, more maneuverable, and more comfortable since it does not require physical effort when steering and there is no need to tilt the vehicle whatsoever during turns, and due to a more comfortable seat for the driver. Compared to cars, the invention provides a much more compact and maneuverable vehicle, while also providing a comparable level of comfort for the driver and passenger.

The following list of reference numerals are utilized throughout the Figures:

Movable part of chassis with meaningful mass (1)
Pivot arms of four-bar pivot arms design (2)
Fixed mid-section of chassis/non-movable part of chassis/central link (3)
Upper pivots (4)
Lower pivots (5)
Steering tube (6) of the front or rear wheel swing arm
Front wheel portion/first link of three linked design (7)
Rear wheel portion/third link of three linked design (8)
Axle (9)
Steering head (10)
Levers (11)
Swing arm (12) (which comprises the steering tube 6)
Front wheel suspension (13)
Rear wheel suspension (14)
Motor (15)
Pivoting arms of the multi linked mechanism/4th component (16)
T-shaped swing arm of the multilinked mechanism/4th component (17)
T-shaped swing arm steering head (18)
Fulcrum of wheel portion (20)
Horizontal shift of CG (4th component) (21)
Angle of turning wheel (4th component) (22)
Semi axle (23)
Narrow wheel (150-250 mm) (24)
Wide wheel (300-450 mm) (25)

Figure 1B:
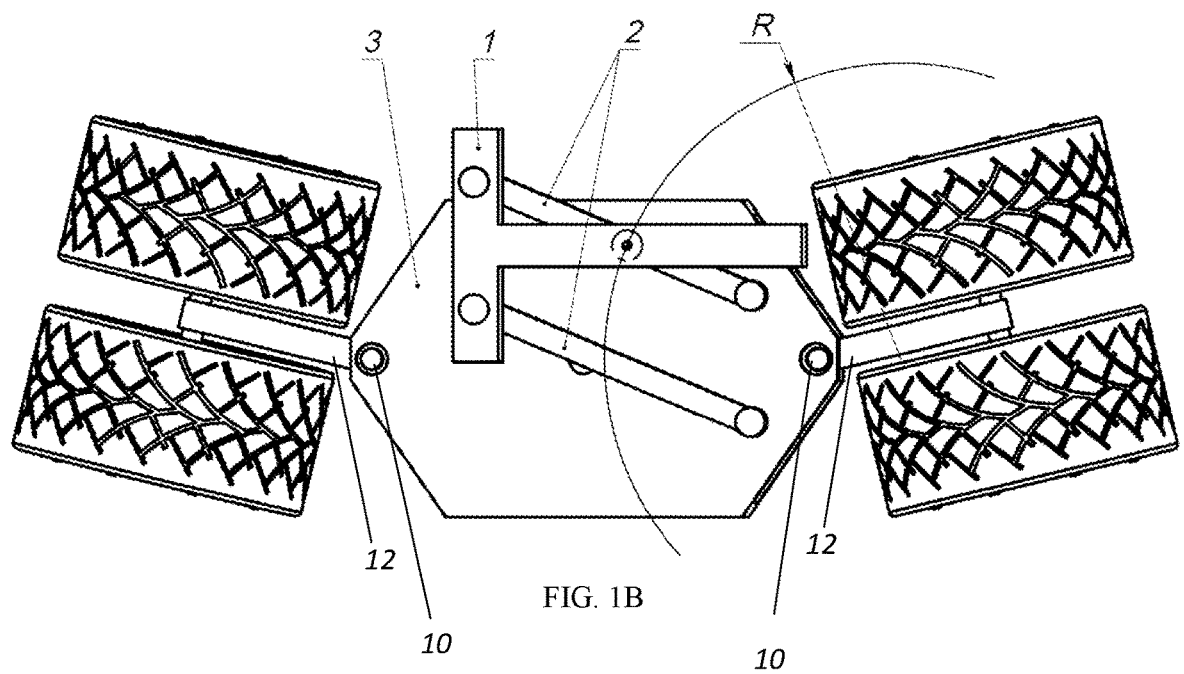
Figure 1C:
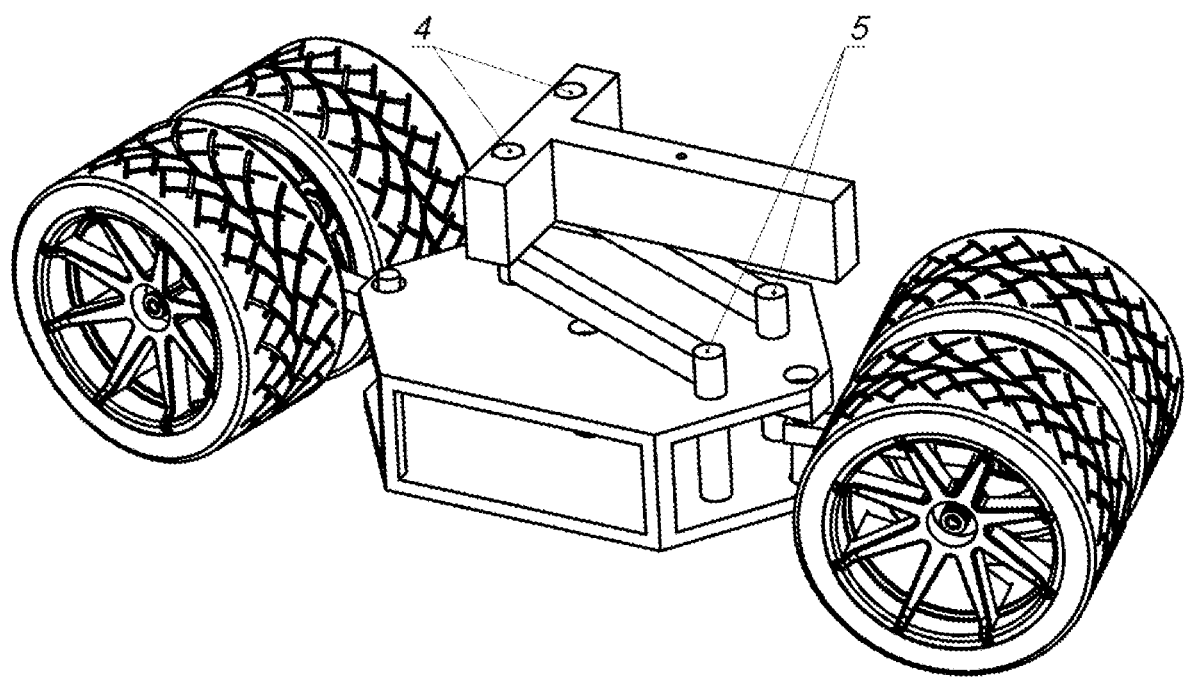

With reference to FIGS. 1A-1C, the invention comprises a high stability vehicle comprising three interlinked portions: a front wheel portion, a chassis portion, and a rear wheel portion. In one embodiment, as shown here, the front and rear wheel portions are attached to the chassis portion in similar manners, via linking mechanisms, each linking mechanism comprising a steering head 10 (i.e., a columnar opening in the chassis), a swing arm 12, the swing arm comprising a steering tube 6 (i.e., a steerer) which is inserted into the steering head 10, and one or more axles 9 which connect(s) the swing arm 12 to the wheels 7, 8. Each of said one or more axles 9 are inserted through a far end of a corresponding swing arm 12 and a center of each wheel of either the front set of wheels 7 or the rear set of wheels 8. The chassis further comprises a fixed part 3, a movable part 1, and two pivoting arms 2 connecting said movable part 1 to said fixed part 3. The two pivoting arms 2 are rotatably connected, via pivots 4, 5, at a first end to the fixed part 3 and at the opposite end to the movable part 1, such that the movable part 1 shifts horizontally relative to the fixed part 3 along an arc having a radius R. In this embodiment, the radius R remains constant because the distance between the rotatable connections of the fixed part (i.e., lower pivots 5) and the distance between the rotatable connections of the movable part (i.e., upper pivots 4) are equal. Due to the horizontal shift of the movable part 1 of the chassis relative to the fixed part 3 of the chassis, the weight of the movable part 1 is shifted relative to the vehicle's center of gravity, which is critical for vehicle stability when the vehicle makes a turn. Such shift occurs in the same direction as the turn to compensate for centrifugal force. Such horizontal shifting is referred to as the first component, above.

Figure 2A:
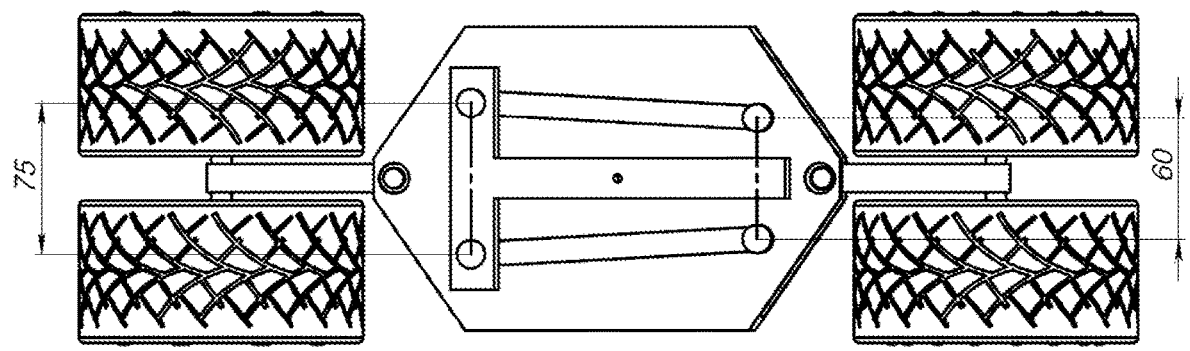
Figure 2B:
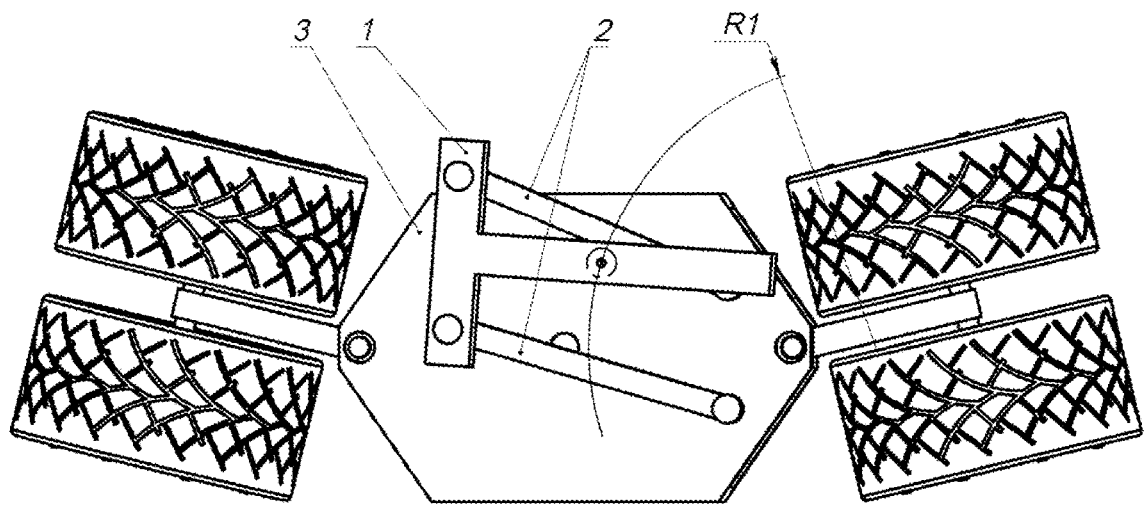
Figure 2C:
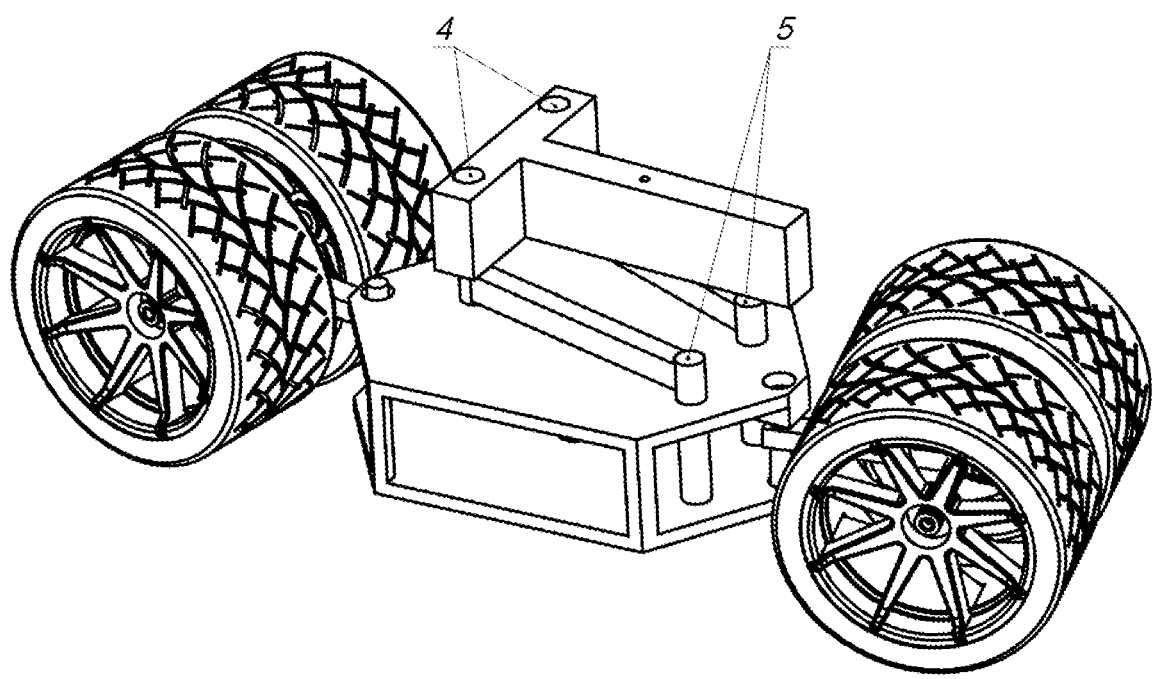

With reference to FIGS. 2A-2C, a second embodiment of the first component is shown, wherein the arc radius R1 alternates because the distance between the lower pivots 5 and the distance between the upper pivots 4 are not equal. In this embodiment, the distance between upper pivots 4 (e.g., 75 mm) is greater than the distance between lower pivots 5 (e.g., 60 mm).

Figure 3A:
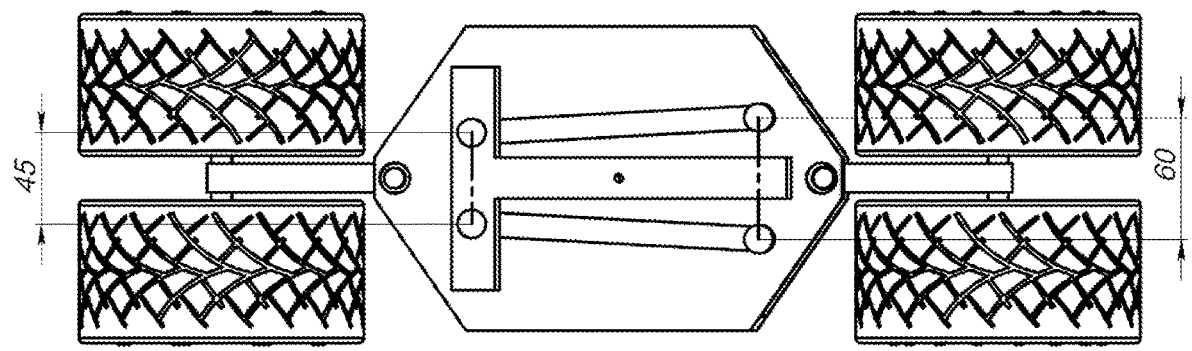
Figure 3B:
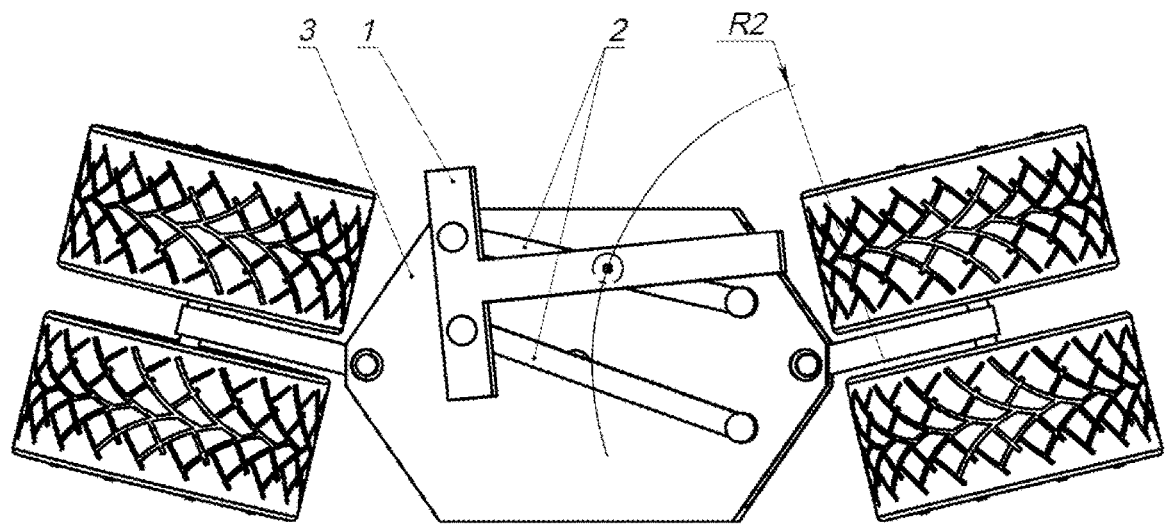
Figure 3C:
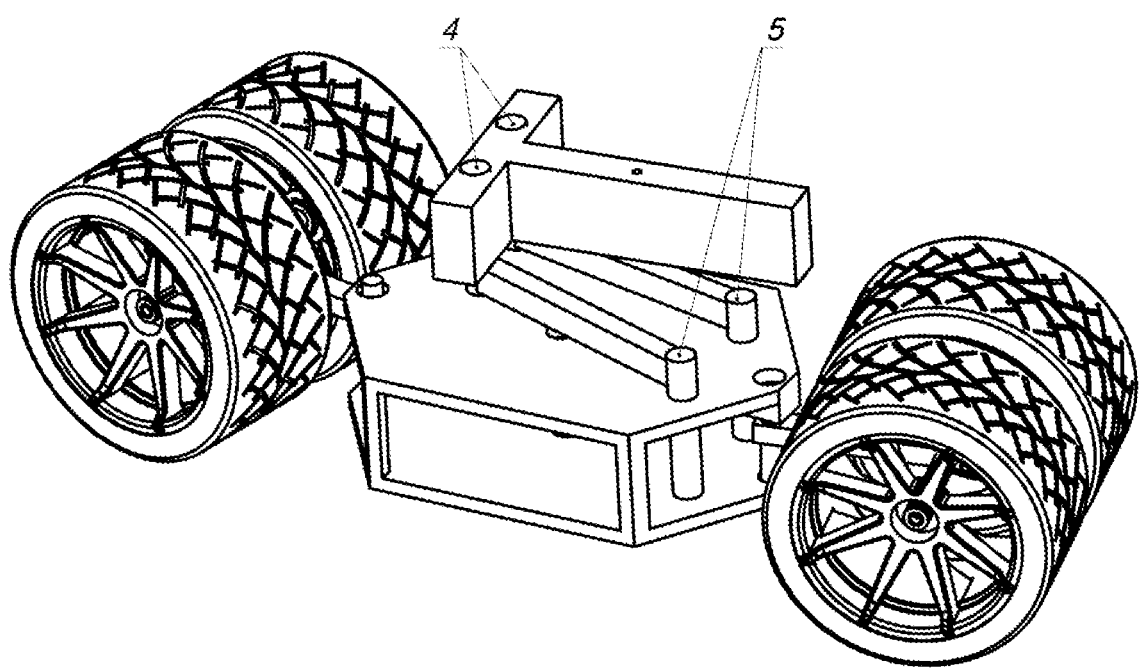

With reference to FIGS. 3A-3C, a third embodiment of the first component is shown, wherein the arc radius R2 alternates because the distance between the lower pivots 5 and the distance between the upper pivots 4 are not equal. In this embodiment, the distance between upper pivots 4 (e.g., 45 mm) is less than the distance between lower pivots 5 (e.g., 60 mm).

Figure 4A:
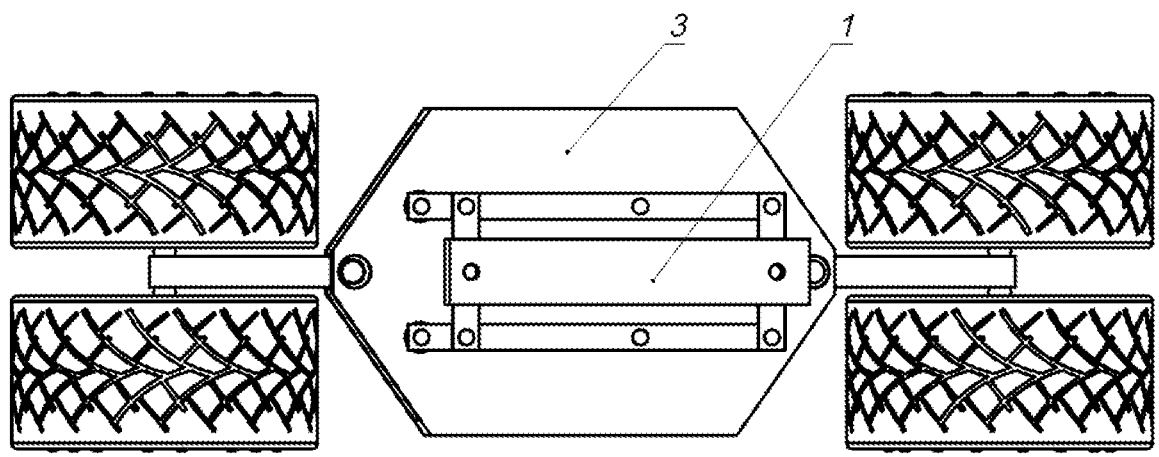
FIGS. 4A-4B. An embodiment comprising a combination of levers connecting the movable part of the chassis to the fixed midsection of the chassis is shown here. In this embodiment, the pivot arms are replaced by one of many possible combinations of levers, said levers being calculated in length and having intersections (points of articulation) and attachment points to the fixed midsection of the chassis, providing a sliding lateral movement of the movable part of chassis relative to the fixed midsection.
Figure 4B:
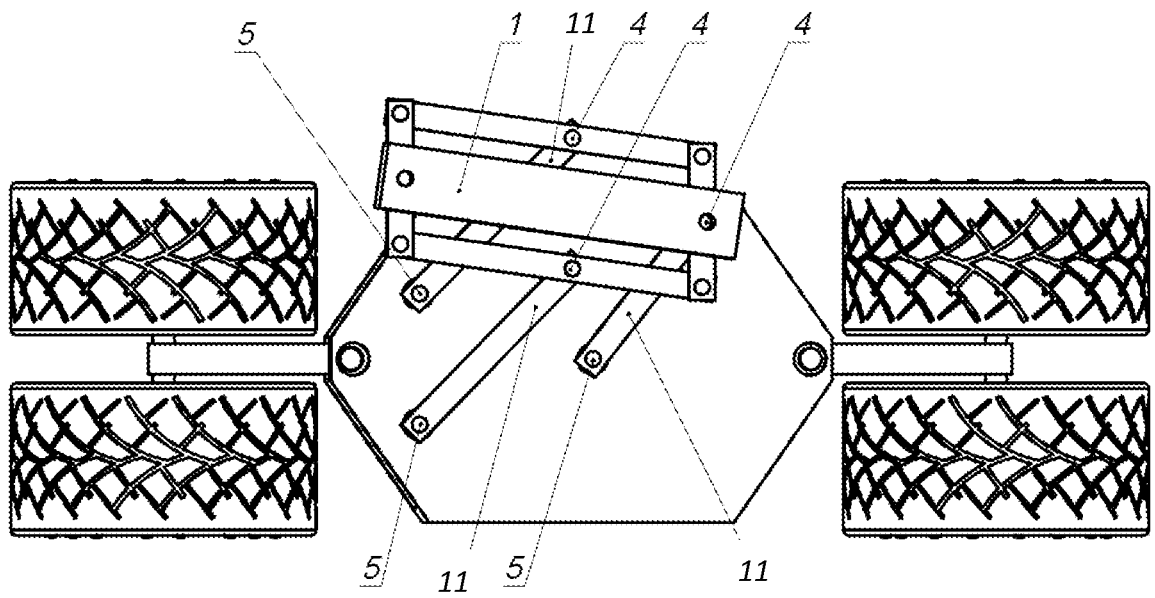

With reference to FIGS. 4A-4B, a fourth embodiment of the first component is shown, wherein, instead of the pivoting arms connecting said fixed part 3 and said movable part 1, a combination of (three or more) levers 11 are rotatably connected, at respective ends of said levers 11, to the fixed part 3 and the movable part 1 of the chassis via upper pivots 4 and lower pivots 5. In this embodiment, exactly three levers 11 are utilized to create a similar horizontal shifting of the movable part 1 of the chassis, relative to the fixed part 3.

Figure 5A:
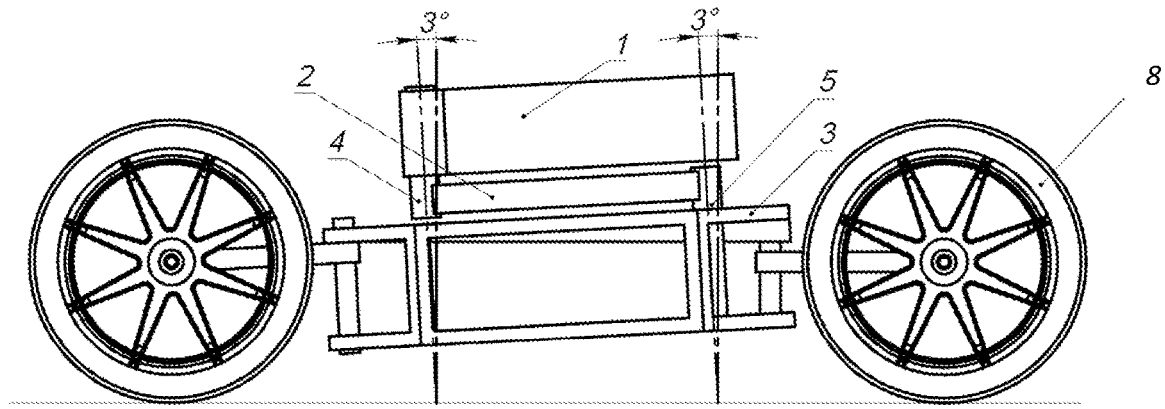
FIGS. 5A-5C. An embodiment comprising various angles of the chassis relative to the horizontal or vertical axis is shown here.
Figure 5B:
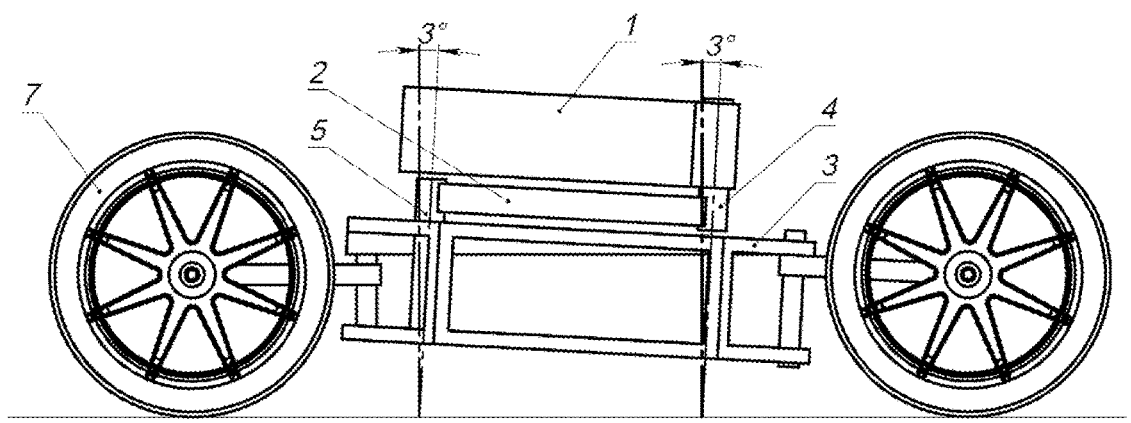
Figure 5C:
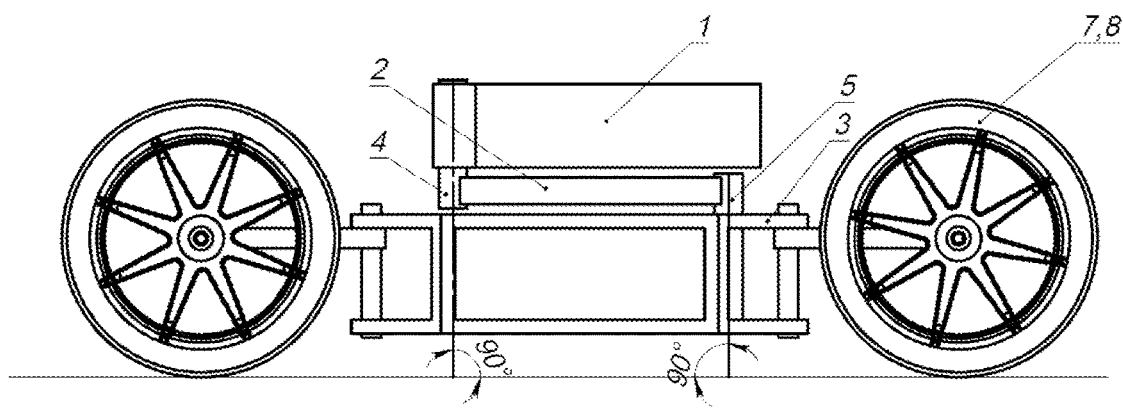

With reference to FIGS. 5A-5C, additional embodiments of the first component are shown, wherein the axles of the pivoting arms and/or linking mechanisms (and thereby the entire chassis) are further fixed having either an incline forward or an incline backward (1-5 degrees), said incline being relative to the vehicle's direction of motion. FIG. 5A shows a fixed incline 3 degrees forward and the lower pivots 5 connected closer to the rear wheel 8. FIG. 5B shows a fixed incline 3 degrees backward and the lower pivots 5 connected closer to the front wheel 7. FIG. 5C shows an embodiment with no incline and the lower pivots 5 connected closer to the rear wheel 8, although such an embodiment may instead have the lower pivots 5 connected closer to the front wheel 7, since there is no incline.

Figure 6A:
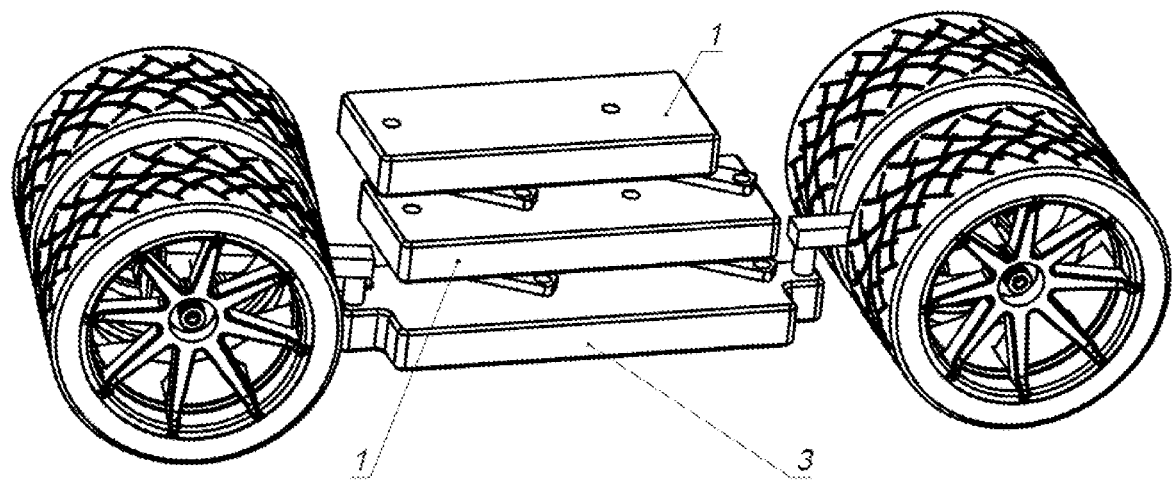
FIGS. 6A-6C. Embodiments comprising additional movable elements above or below the fixed portion of the chassis are shown here.
Figure 6B:
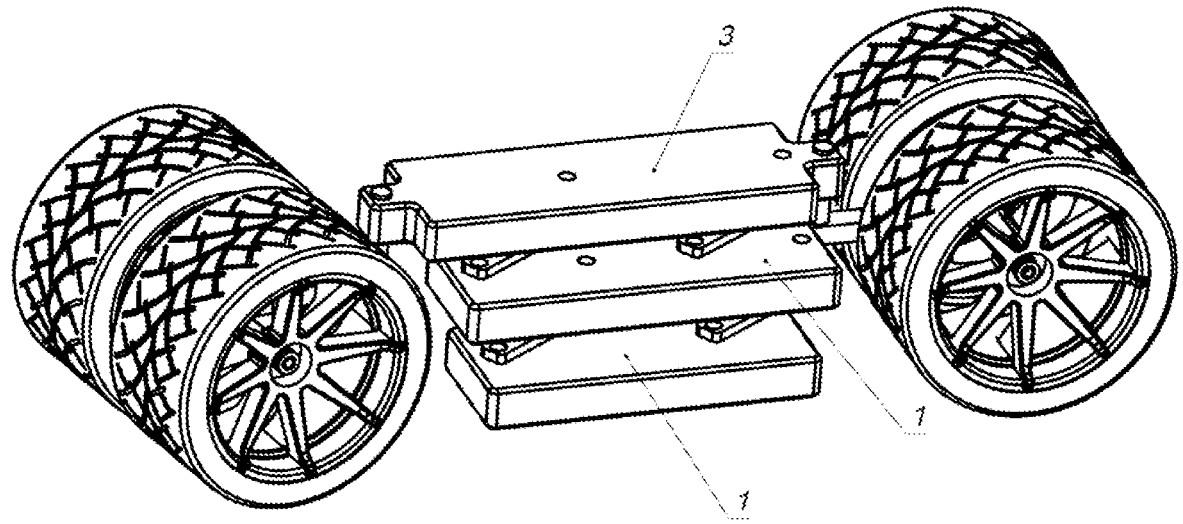
Figure 6C:
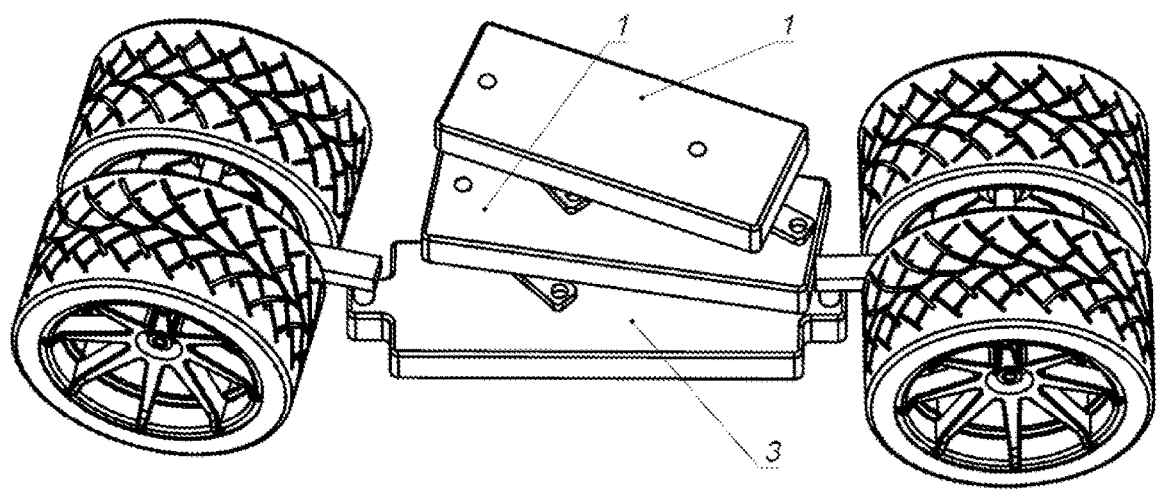

With reference to FIGS. 6A-6C, additional embodiments of the movable part 1 of the chassis are shown, wherein the movable part 1 resembles a step-like structure. The step-like structure may be positioned above the fixed part of the chassis (FIG. 6A) or below the fixed part of the chassis (FIG. 6B). The step-like structure may comprise parallel platforms (FIGS. 6A-6B) or non-parallel, spiraling platforms (FIG. 6C). Such a step-like structure may thus comprise two or more movable parts 1 of the chassis, said movable parts 1 being positioned above or below the fixed part 3.

Figure 7B:
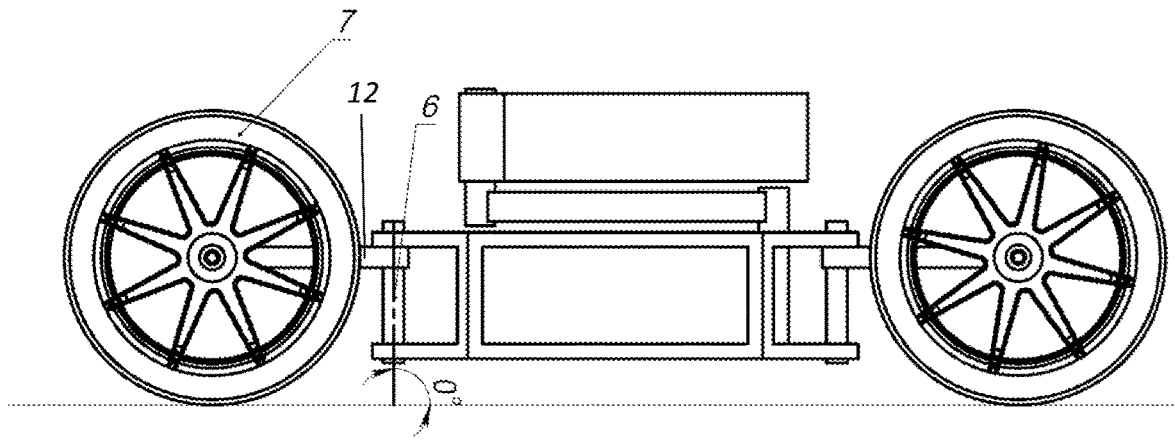

With reference to FIGS. 7A-7B, the steering head position is shown, wherein the entire swing arm 12 is connected to the chassis entirely behind the front wheel via the steering tube 6. The swing arm 12 may be fixed to have a negative castor (FIG. 7A) or to have a zero degree castor (FIG. 7B).

Figure 8A:
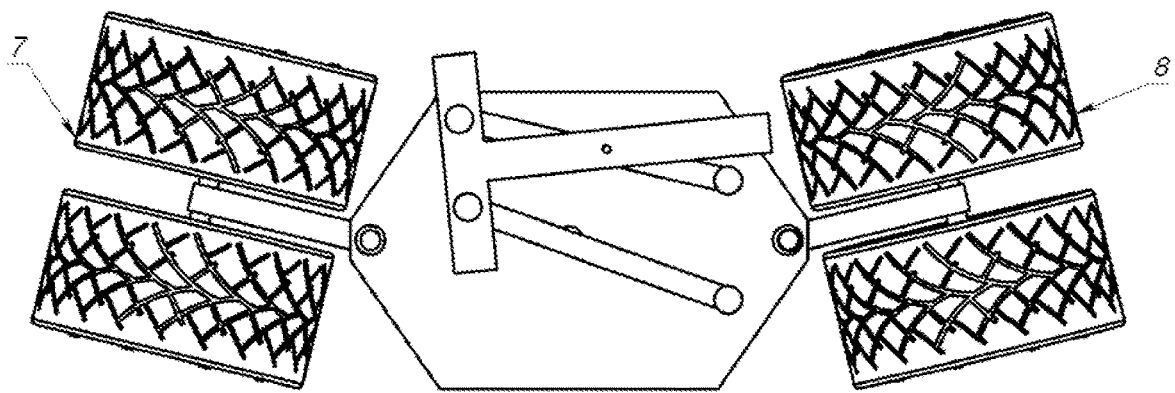
FIGS. 8A-8C. Embodiments for various wheel turning (i.e., steering) directions are shown here.
Figure 8B:
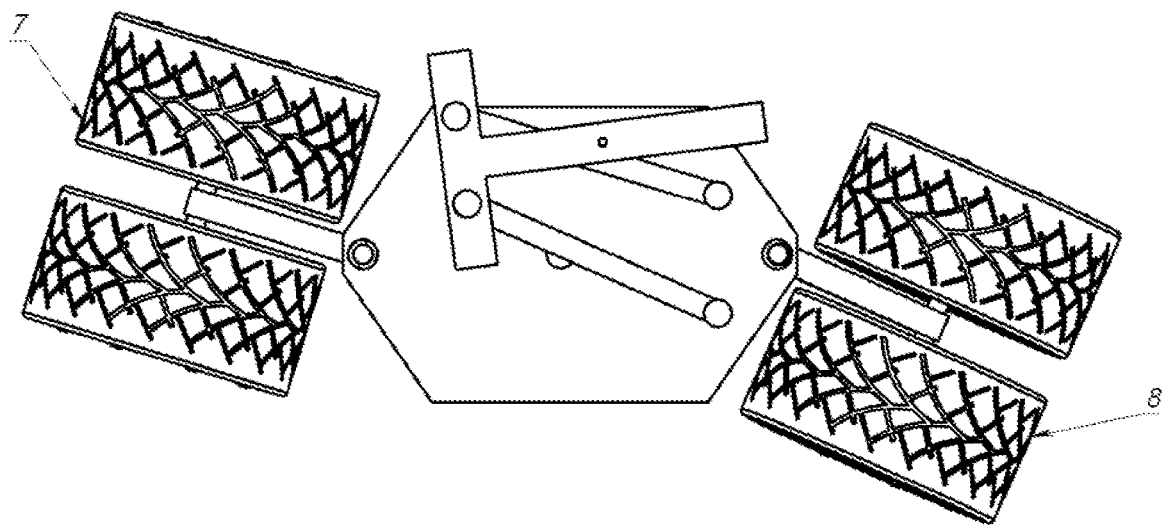
Figure 8C:
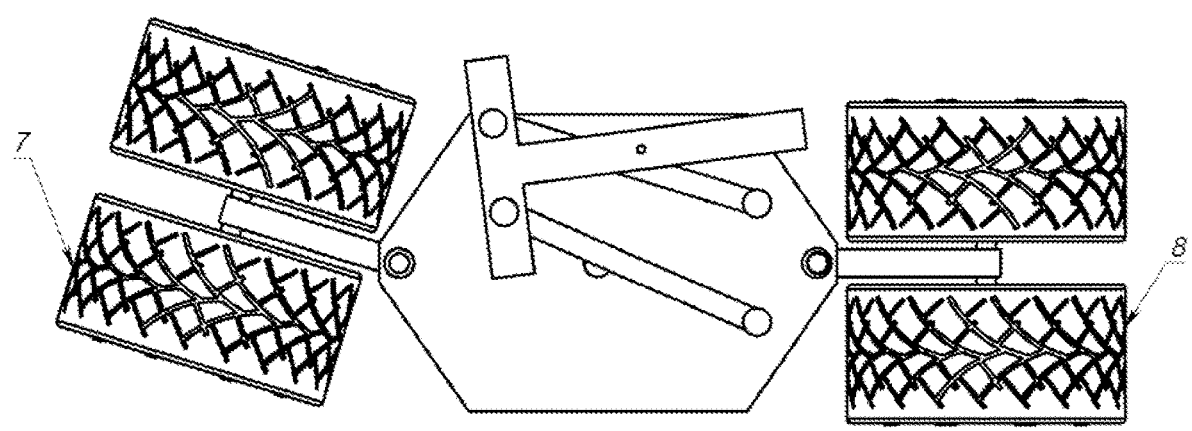

With reference to FIGS. 8A-8C, the vehicle is designed such that the front and rear wheel swing arms rotate in opposite directions (FIG. 8A) or in the same direction (FIG. 8B). In turn, the front and/or rear wheels can be steered in corresponding directions. Alternatively, one of the wheel swing arms (either front or rear) may be locked in a straight position while the opposite wheel swing arm is rotated in either direction (FIG. 8C). Such a design is referred to as the second component, above.

Figure 9:
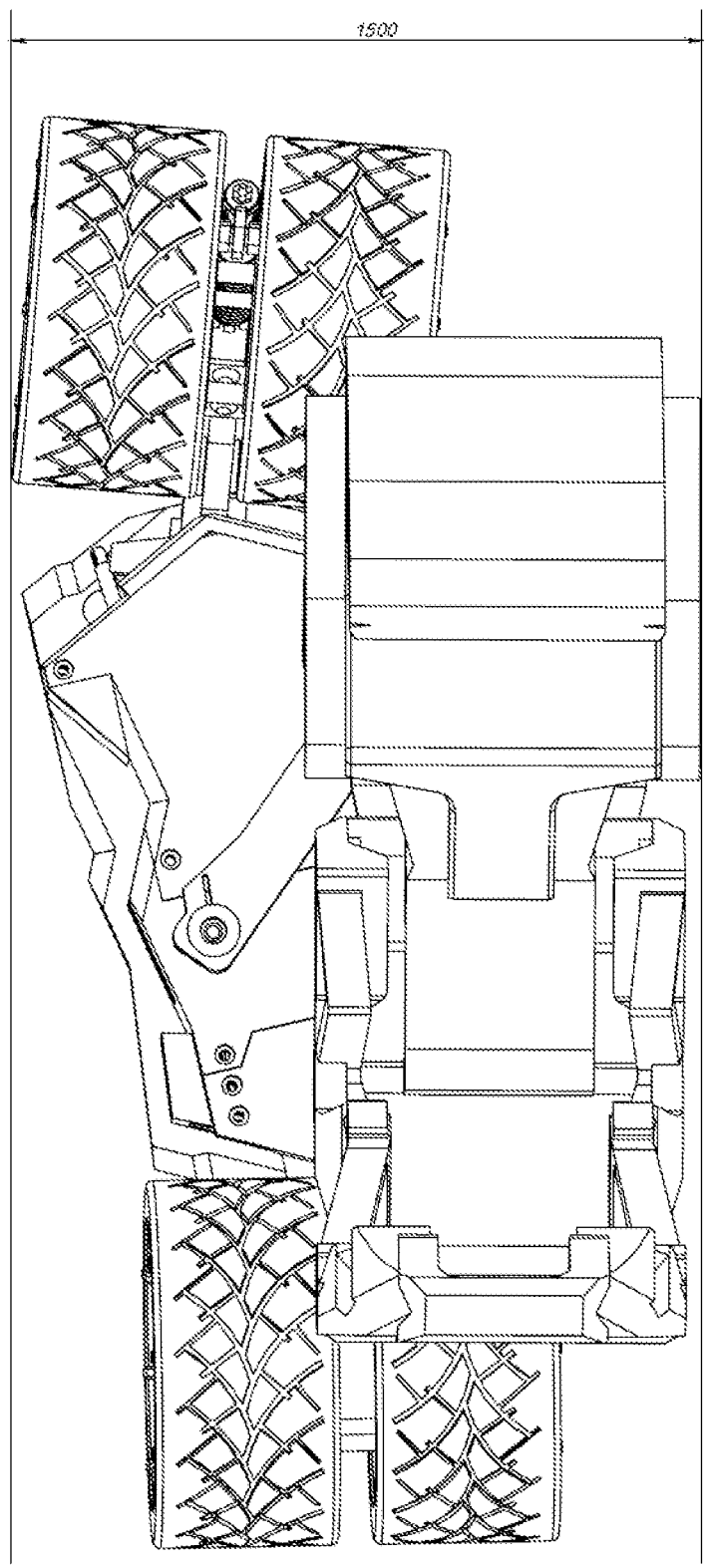
FIG. 9. This figure illustrates an example of the turning corridor of the present invention at high speeds. At such high speeds and when turning/cornering, the turn corridor of the vehicle increases. One set of wheels occupies the extreme inner position within the turning corridor, and the other pair (or the movable part of the chassis, as shown here) occupies the outermost position of the turning corridor, while the fixed part of the chassis is located diagonally relative to the direction of travel. Such a design provides greater stability and prevents any overturning due to the action of centrifugal force.

With reference to FIG. 9, a top view of the vehicle is presented to illustrate the maximum width of the vehicle during a turn (i.e., the turning/cornering corridor). Given the inventive design, the turning corridor of the vehicle always remains no greater than double the minimal width of the vehicle (e.g., when the front and rear wheels are in line). This particular embodiment illustrates the vehicle performing a right turn, wherein the rear wheel is fixed in a straight position, the front wheel is rotated to the right via its swing arm, and the movable part of the chassis is shifted to the right of the fixed part of the chassis. The turning corridor, as defined by the leftmost portion of the front wheel and the rightmost portion of the movable part of the chassis, is double the minimal width of the vehicle.

Figure 10A:
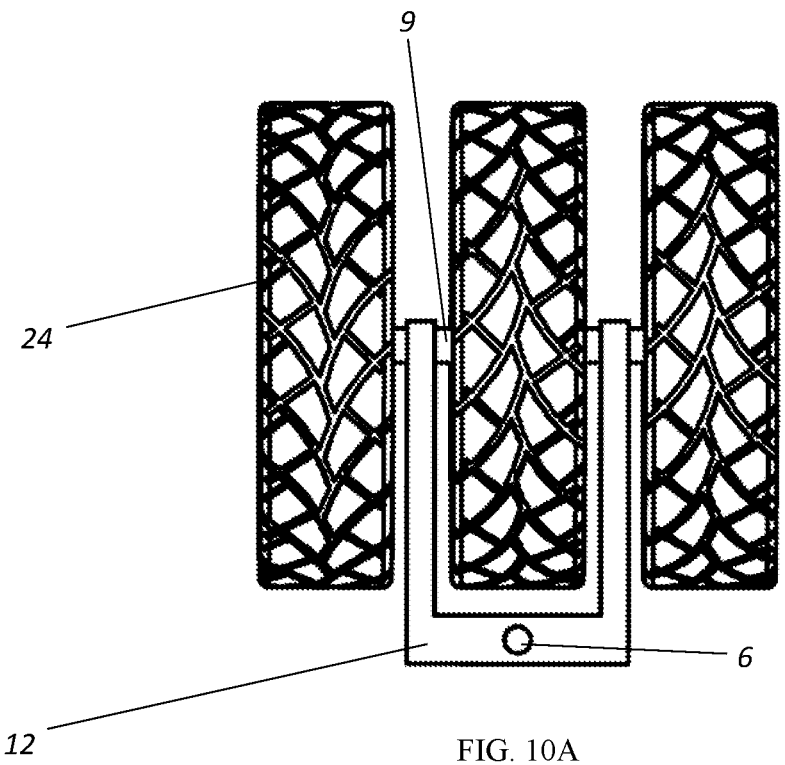
FIGS. 10A-10D. Varying embodiments for the sets of front and rear wheels are shown here.
Figure 10B:
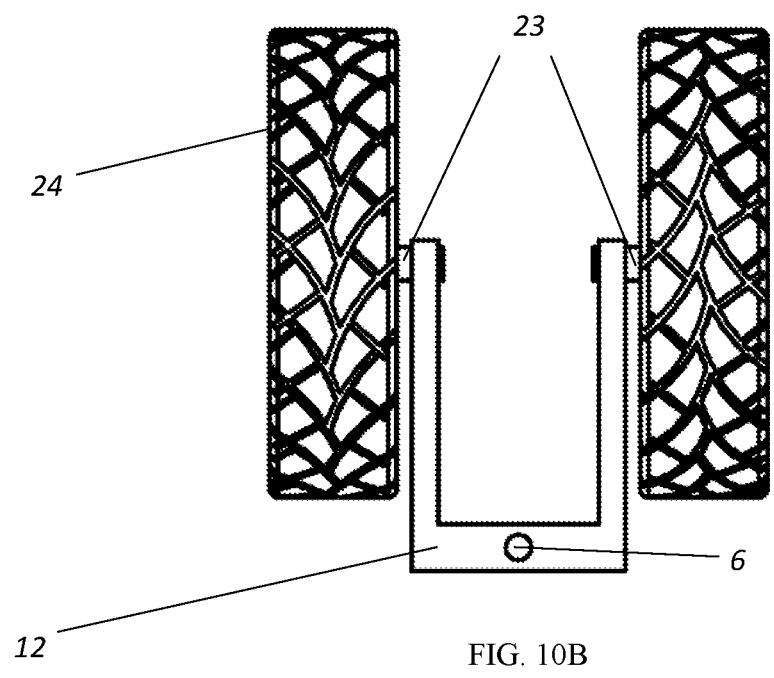
Figure 10C:
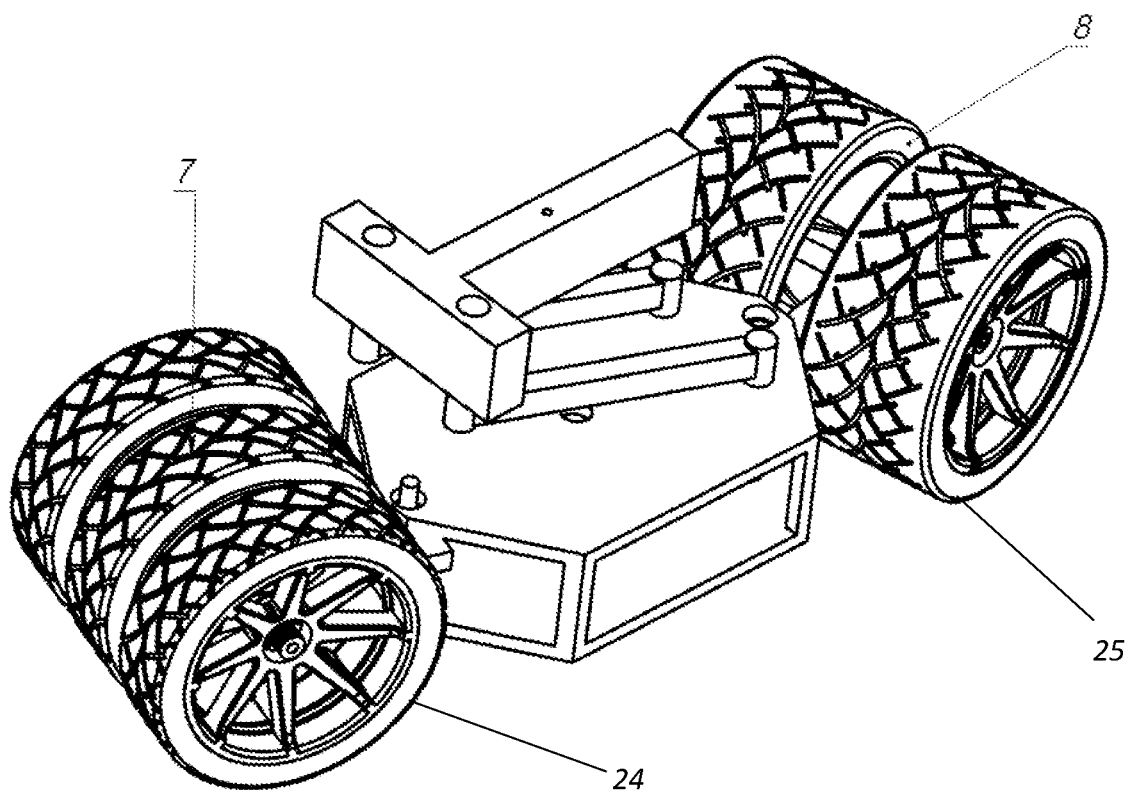
Figure 10D:
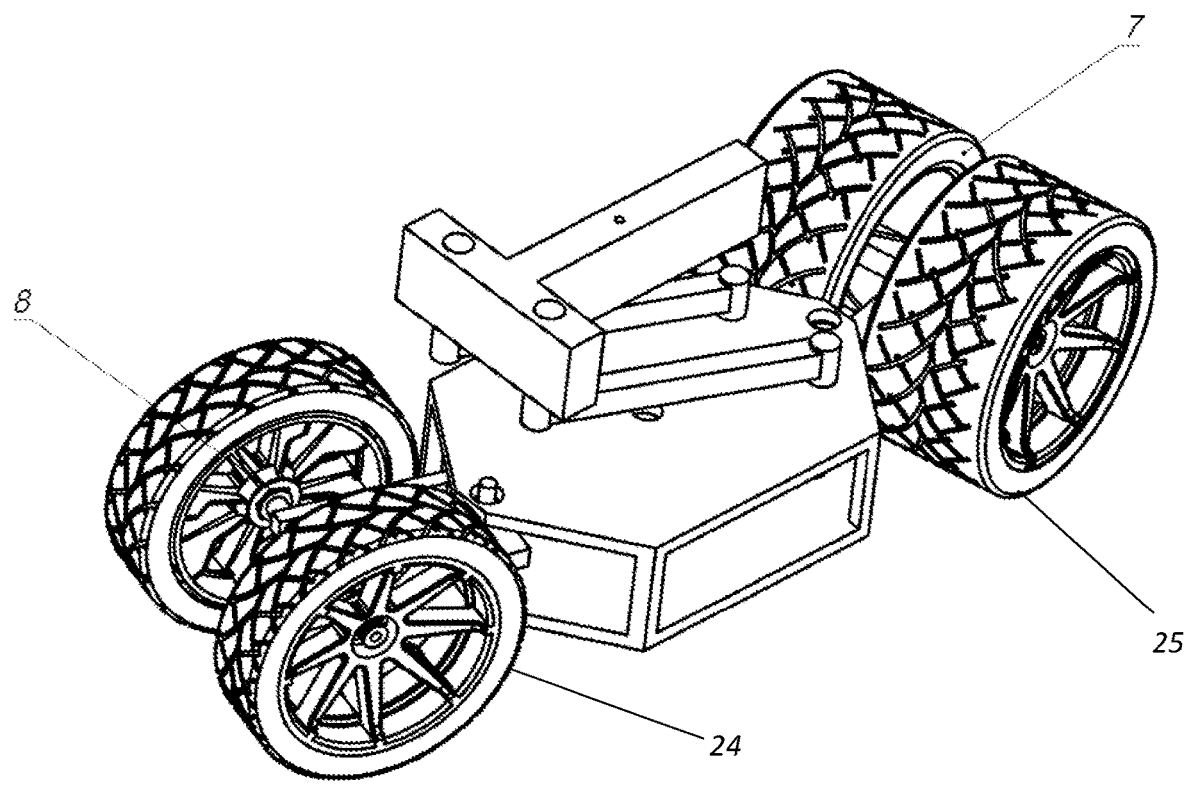

With reference to FIGS. 10A-10C, various embodiments for the front and rear wheel portions are shown. The wheel portions 7, 8 may comprise a swing arm 12, a single full axle 9, and three narrow wheels (e.g., each wheel being 150-250 mm wide) 24, connected to the chassis via a steering tube 6 of the swing arm 12 (FIG. 10A). Alternatively, the wheel portions 7, 8 may comprise a swing arm 12, two semi-axles 23, and two narrow wheels, each of said semi-axles 23 connecting the swing arm 12 to one of the two narrow wheels, and the wheel portion being connected to the chassis via a steering tube 6 of the swing arm 12 (FIG. 10B). FIGS. 10C-10D illustrate each of these alternate embodiments as front wheel portions relative to the entire vehicle. In addition, the wheel portions may comprise a swing arm 12, a single full axle 9, and two wide wheels (e.g., each wheel being 300-450 mm wide) 25, as illustrated in the respective wheel portions of FIGS. 10C-10D. Such alternate designs are referred to as the third component, above.

With reference to FIGS. 11A-11F, various camber and toe values for the vehicle may be provided through the utilization of cone profile tires positioned as shown in the exemplary embodiments of these figures.

Figure 12B:
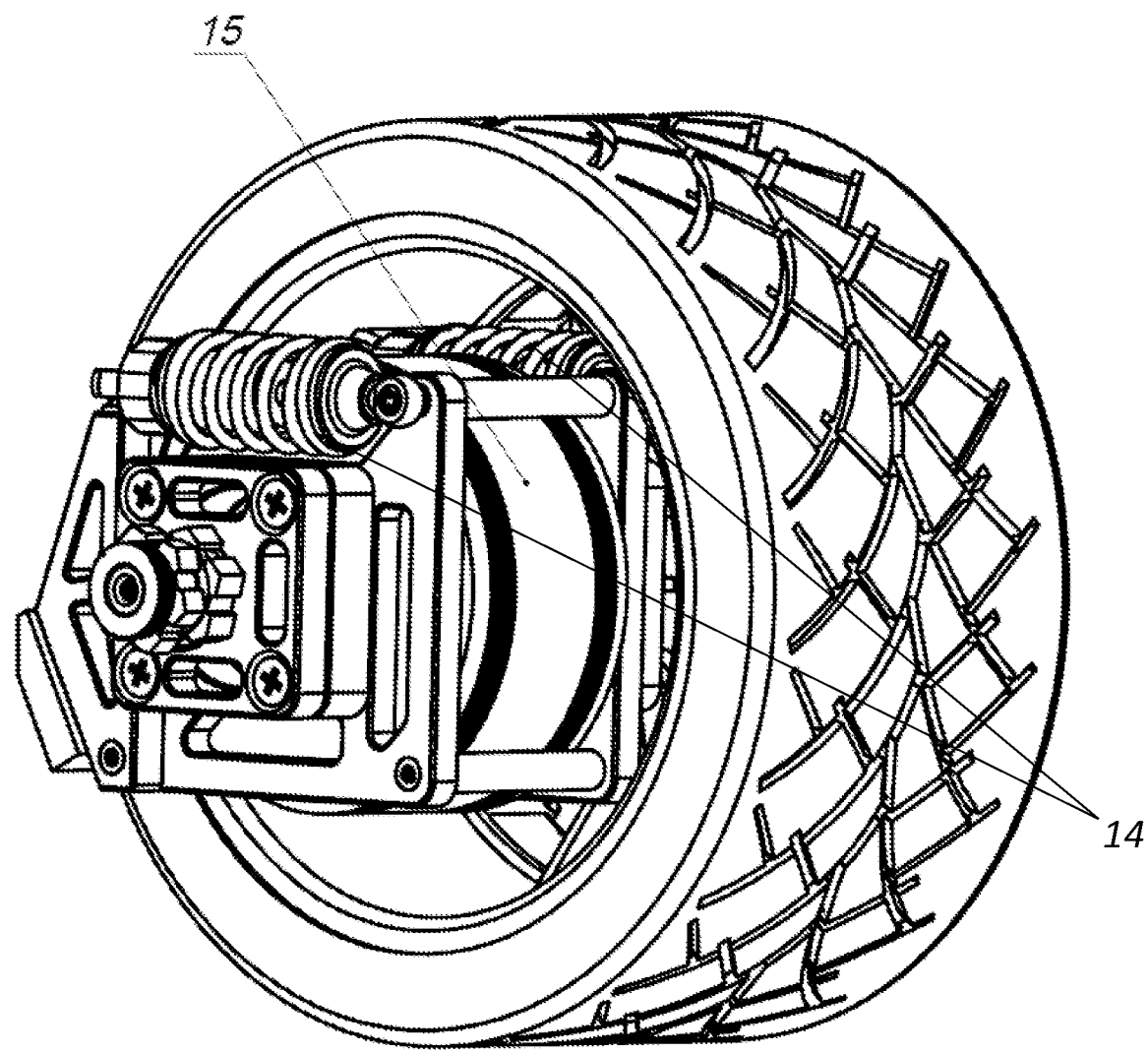

With reference to FIGS. 12A-12B, the suspension 13, 14 and motor 15 of a vehicle may be positioned entirely within the inner space of respective wheel portions. The front wheel portion of the vehicle may comprise a front inner wheel space for housing and protecting the front wheel suspension 13 (FIG. 12A), and the rear wheel portion of the vehicle may comprise a rear inner wheel space for housing and protecting both the rear wheel suspension 14 and an electric motor 15 (FIG. 12B). It is further noted that both sets of wheels may comprise inner wheel space for housing both a suspension and a motor (e.g., in the case of an all-wheel drive vehicle).

Figure 13A:
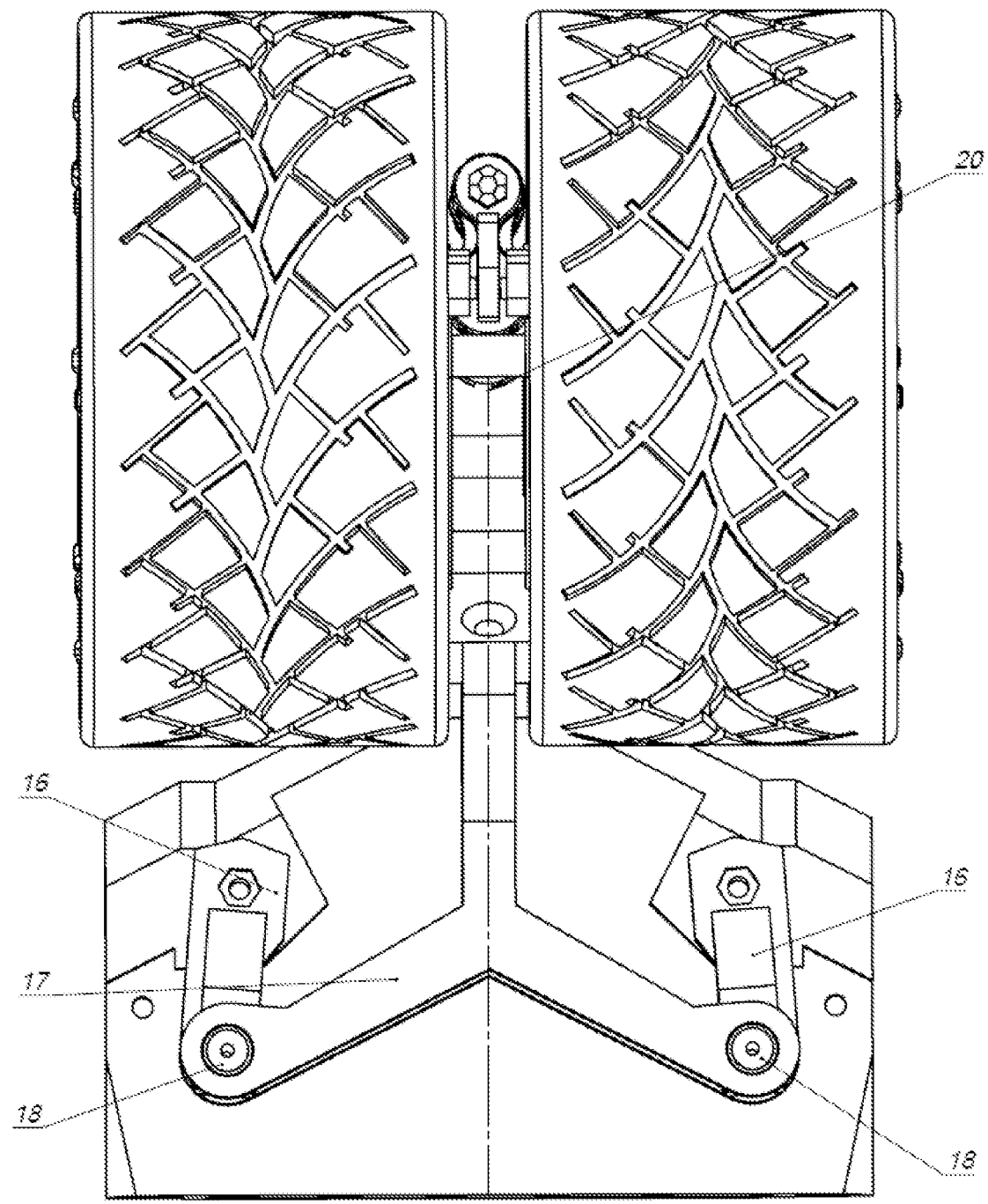
FIGS. 13A-13B. These figures illustrate, by example, the kinematics of the multi-linked mechanism, where the swing arm of the front wheel moves relative only to the chassis and in a direction opposite to the direction of a turn. From such motion, the vehicle's center of gravity is shifted away from the fulcrum of the turning set of wheels in a direction of the turn.
Figure 13B:
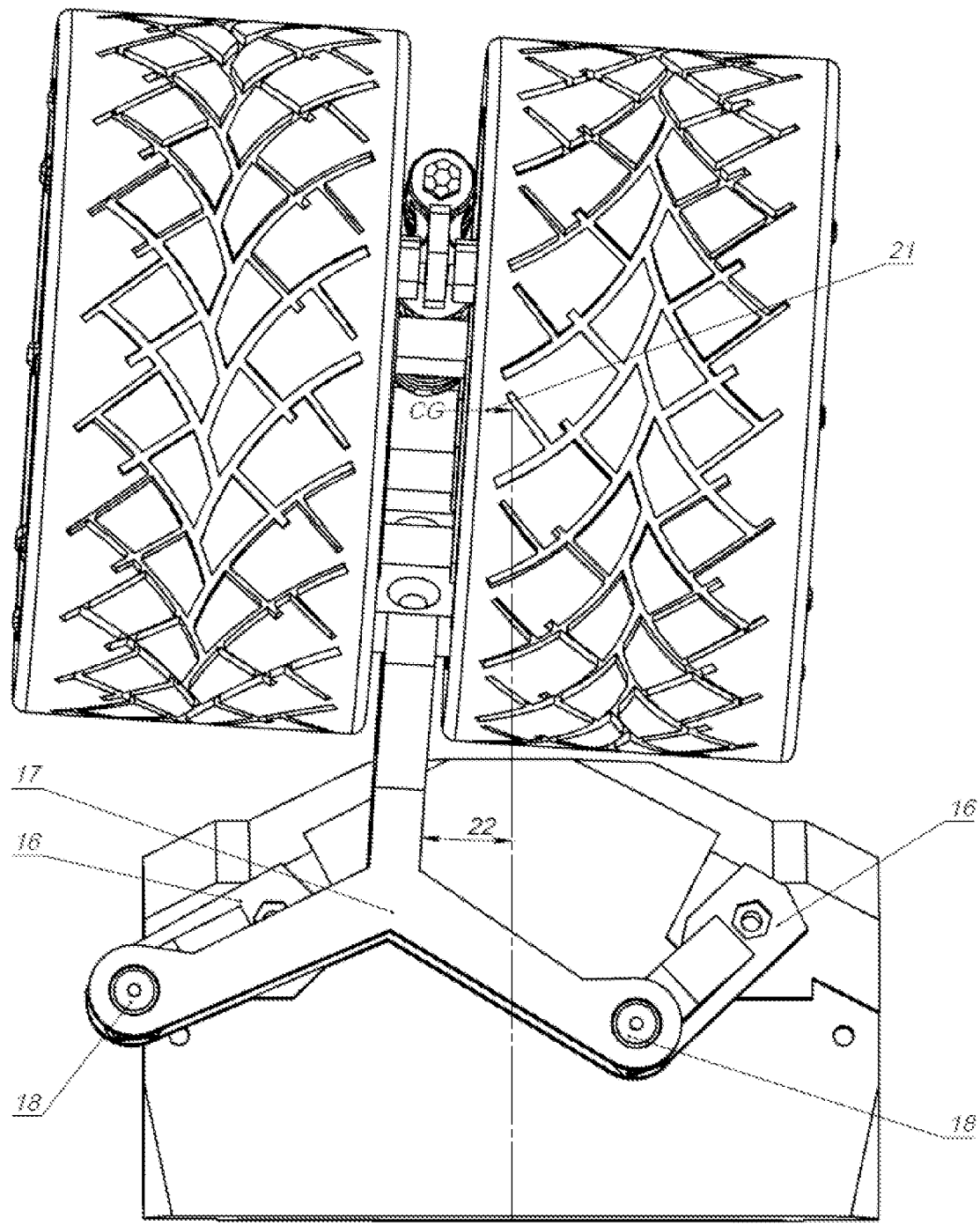

With reference to FIGS. 13A-13B, an alternate embodiment is shown for the linking mechanism connecting the fixed part of the chassis and the front and/or rear wheel portion. Such an alternate embodiment for the linking mechanism comprises two pivoting arms 16, the two pivoting arms comprising a right-side pivoting arm and a left side pivoting arm, the pivoting arms being rotatably connected at one of each of their ends to a respective side of the fixed part of the chassis. Each one of the two pivoting arms are further rotatably connected, at each of their opposite ends to respective ends (i.e., right and left ends) of a T-shaped swing arm 17. The third (i.e., front) end of the T-shaped swing arm 17 is connected to said wheels via an axle at the fulcrum 20 of the set of wheels. During straight movement (i.e., when not turning), the fulcrum 20 of the wheel portion is located in-line with the vehicle's center of gravity CG. When turning/cornering, the T-shaped swing arm 17 swings in a direction opposite the vehicle's turning direction, via the rotation of the two pivoting arms 16. Such an embodiment allows for the wheel portion to turn in a desired direction and at an angle 22 while simultaneously shifting the vehicle's center of gravity CG relative to the fulcrum of the wheel by a given distance 21. Such a horizontal shift of the wheel portion relative to the vehicle's center of gravity, occurring in the direction opposite to the turn being made, shifts the vehicle's center of gravity in the direction of the turn, resulting in greater turning stability. This type of design is referred to as the fourth component, above.

Figure 14:
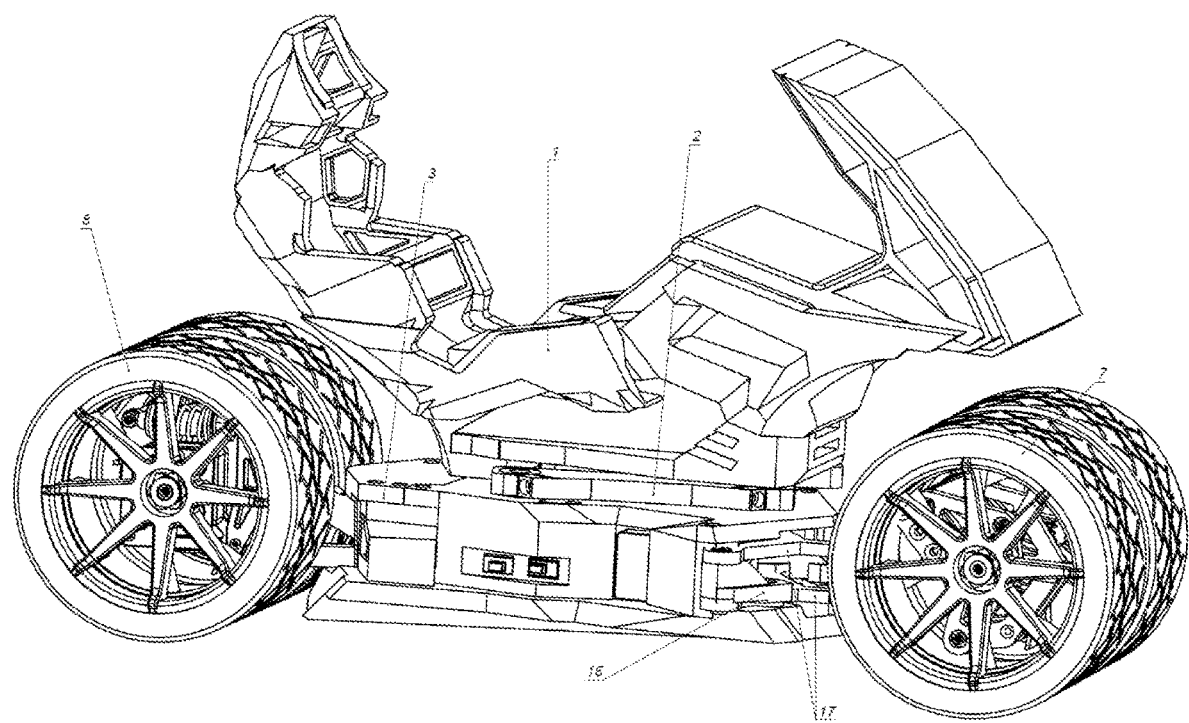
FIG. 14. This figure shows an example embodiment of a complete vehicle according to the present invention.

With reference to FIG. 14, a full vehicle embodiment is shown comprising a movable part of the chassis which is open to the environment.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A high stability vehicle, comprising:
   three interlinked portions comprising a front wheel portion, a chassis portion, and a rear wheel portion, said chassis portion being positioned between said front wheel portion and said rear wheel portion,
   said chassis portion comprising a fixed part, a movable part, and one or more pivoting arms, said one or more pivoting arms connecting said movable part to said fixed part,
   said one or more pivoting arms being rotatably connected at their first end to said fixed part and at their opposite end to said movable part such that said movable part swings about an arc having a radius when the high stability vehicle makes a turn, said swinging causing said movable part to shift horizontally relative to said fixed part towards the turn.

2. The vehicle of claim 1, wherein the radius remains constant.

3. The vehicle of claim 1, wherein the radius alternates.

4. The vehicle of claim 1, wherein said one or more pivoting arms comprises a combination of three or more levers rotatably connected, at respective ends of said levers, to the fixed part of the chassis via lower pivots and to the movable part of the chassis via upper pivots.

5. The vehicle of claim 1, wherein said chassis portion has a forward incline relative to the vehicle's direction of motion, and wherein points connecting said one or more pivoting arms with said fixed part are nearer to said rear wheel portion.

6. The vehicle of claim 1, wherein said chassis portion has a backward incline relative to the vehicle's direction of motion, and wherein points connecting said one or more pivoting arms with said fixed part are nearer to said front wheel portion.

7. The vehicle of claim 1, wherein said movable part comprises a platform and one or more movable elements that slide relative to said platform, said one or more movable elements being positioned above or below the platform.

8. The vehicle of claim 1, wherein said front wheel portion and said rear wheel portion are each attached to said chassis portion via a linking mechanism, each linking mechanism comprising a steering head located in said chassis portion and a swing arm, the swing arm comprising a steering tube which is inserted into the steering head, said swing arm being coupled to two or more wheels via an axle, said axle being inserted through a far end of said swing arm and a center of each of said two or more wheels.

9. The vehicle of claim 8, wherein a first one of the steering heads is positioned entirely behind the front wheel portion and a second one of the steering heads is positioned entirely in front of the rear wheel portion.

10. The vehicle of claim 8, wherein the swing arm of the front wheel portion has a negative castor.

11. The vehicle of claim 1, wherein said front and rear wheel portions turn simultaneously in opposite directions.

12. The vehicle of claim 1, wherein said front and rear wheel portions turn in a same direction.

13. The vehicle of claim 1, wherein a first wheel portion of said front and rear wheel portions is locked in a straight position while an opposite wheel portion steers.

14. The vehicle of claim 1, having a width of $W_s=x$ when moving in a straight line, and having a maximum width of $W_{max}=2x$ when turning.

15. The vehicle of claim 1, having a width of 750-1000 mm, equaling a width of the wheel portion.

16. The vehicle of claim 1, wherein said front and rear wheel portions comprise three wheels attached via a single full axle to a swing arm, said swing arm being connected to a steering head of said chassis portion via a steering tube, wherein each one of said three wheels is 150-250 mm wide.

17. The vehicle of claim 1, wherein said front and rear wheel portions comprise two wheels attached via two semi axles to a swing arm, each of said semi-axles connecting the swing arm to one of the two wheels, said swing arm being connected to a steering head of the chassis portion via a steering tube, wherein each one of said two wheels is 150-250 mm wide.

18. The vehicle of claim 1, wherein said front and rear wheel portions comprise two wheels attached via a single full axle to a swing arm, said swing arm being connected to a steering head of said chassis portion via a steering tube, each one of said two wheels being 270-450 mm wide.

19. The vehicle of claim 1, wherein said front and rear wheel portions comprise tapered tires, each of said tapered tires having a rim diameter of 18-22 inches and a total outer diameter of 650-800 mm.

20. The vehicle of claim 1, wherein said front and/or said rear wheel portion comprises a front inner wheel space for housing a suspension and/or an electric motor.

21. A high stability vehicle, comprising:

three interlinked portions comprising a front wheel portion, a chassis portion, and a rear wheel portion, said chassis portion being positioned between said front wheel portion and said rear wheel portion, a linking mechanism connecting the fixed part to the front and/or rear wheel portion, said linking mechanism comprising two pivoting arms, the two pivoting arms comprising a right-side pivoting arm and a left side pivoting arm, each of the pivoting arms being rotatably connected at one of their ends to a respective side of the fixed part, each of the two pivoting arms being further rotatably connected at each of their opposite ends to right and left ends of a T-shaped swing arm such that said T-shaped swing arm swings in a direction opposite to a turning direction of the high stability vehicle, said T-shaped swing arm having a front end connected to wheels of said front and/or rear wheel portion, said wheels being connected via an axle.

\* \* \* \* \*